Aug. 16, 1932.  J. LAWSON ET AL  1,872,598
JACQUARD PATTERN MECHANISM FOR KNITTING MACHINES
AND METHOD OF PATTERNING EFFECTED THEREBY
Filed April 8, 1927  13 Sheets-Sheet 11
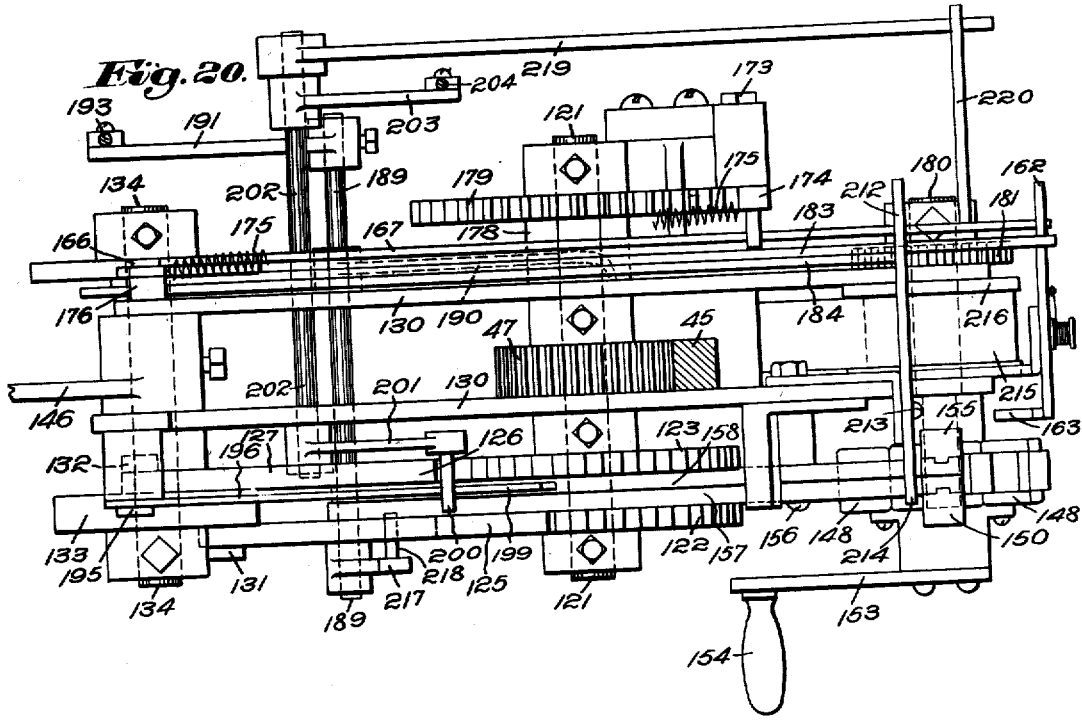
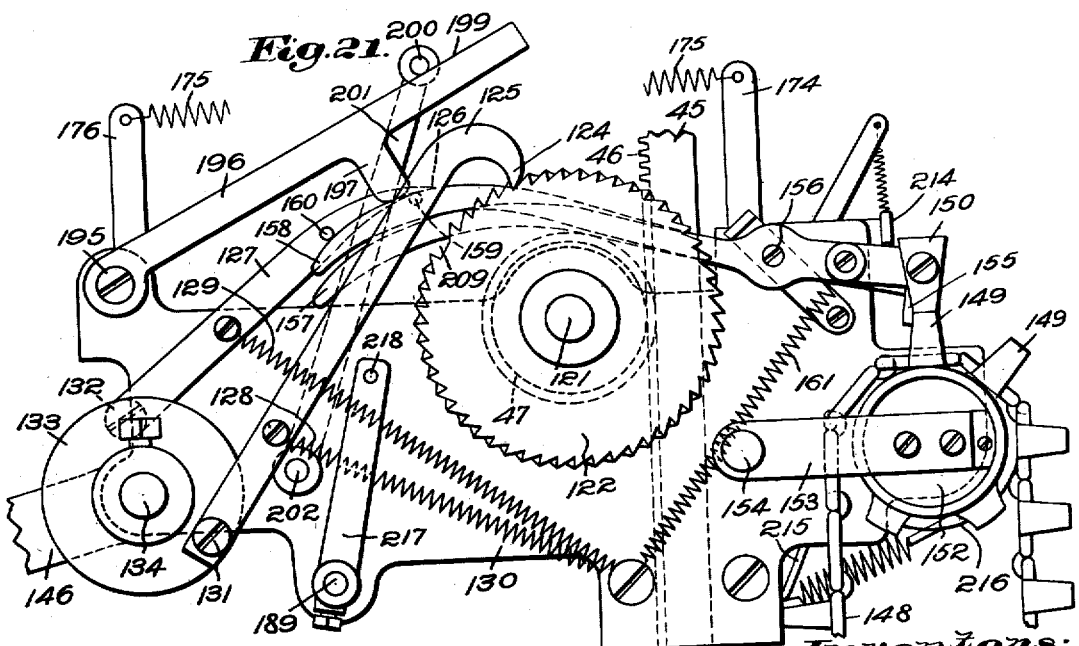
Inventors:
John Lawson,
Robert H. Lawson,
by Emery, Booth, Janney and Varney
Attys.

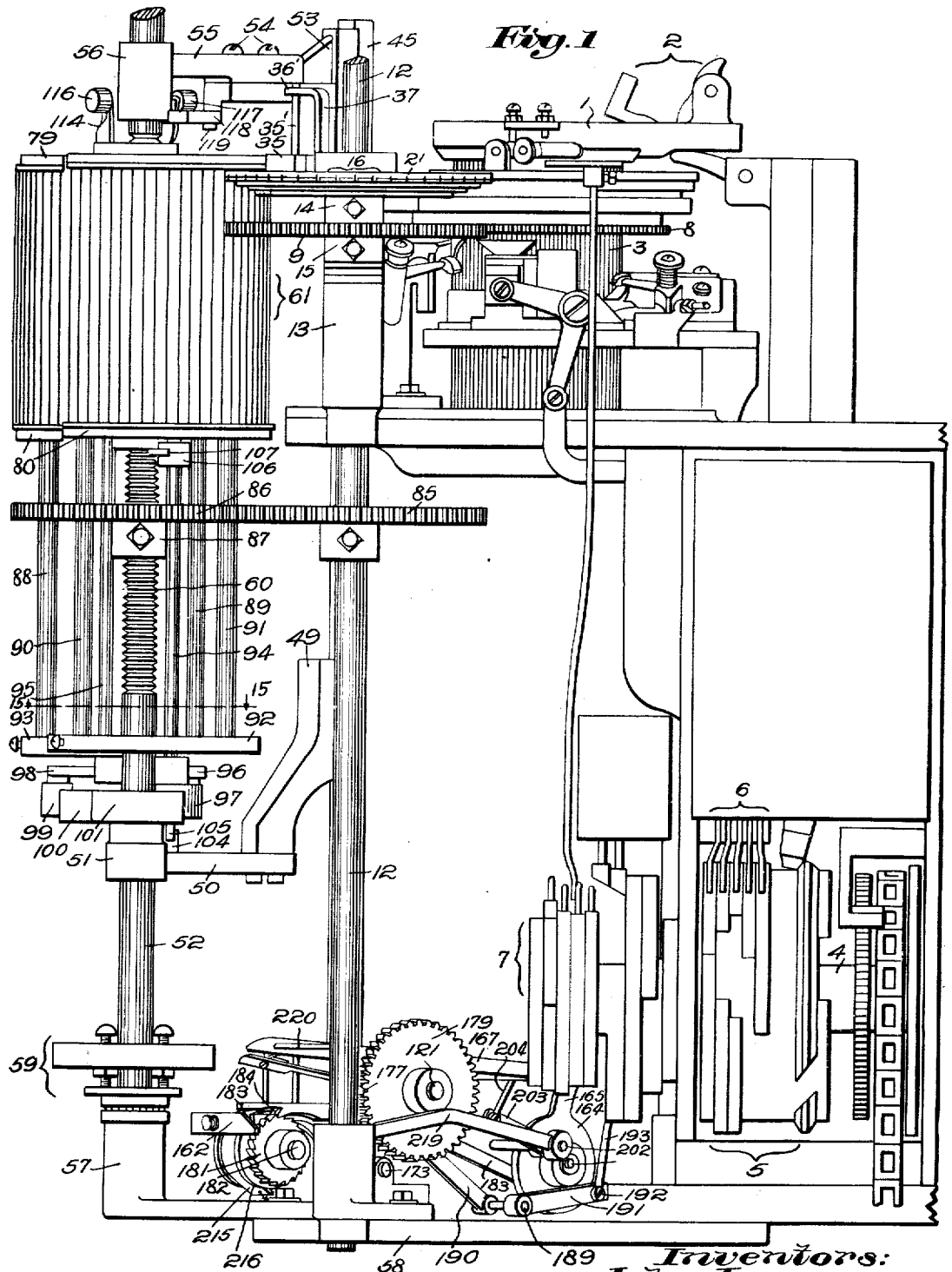

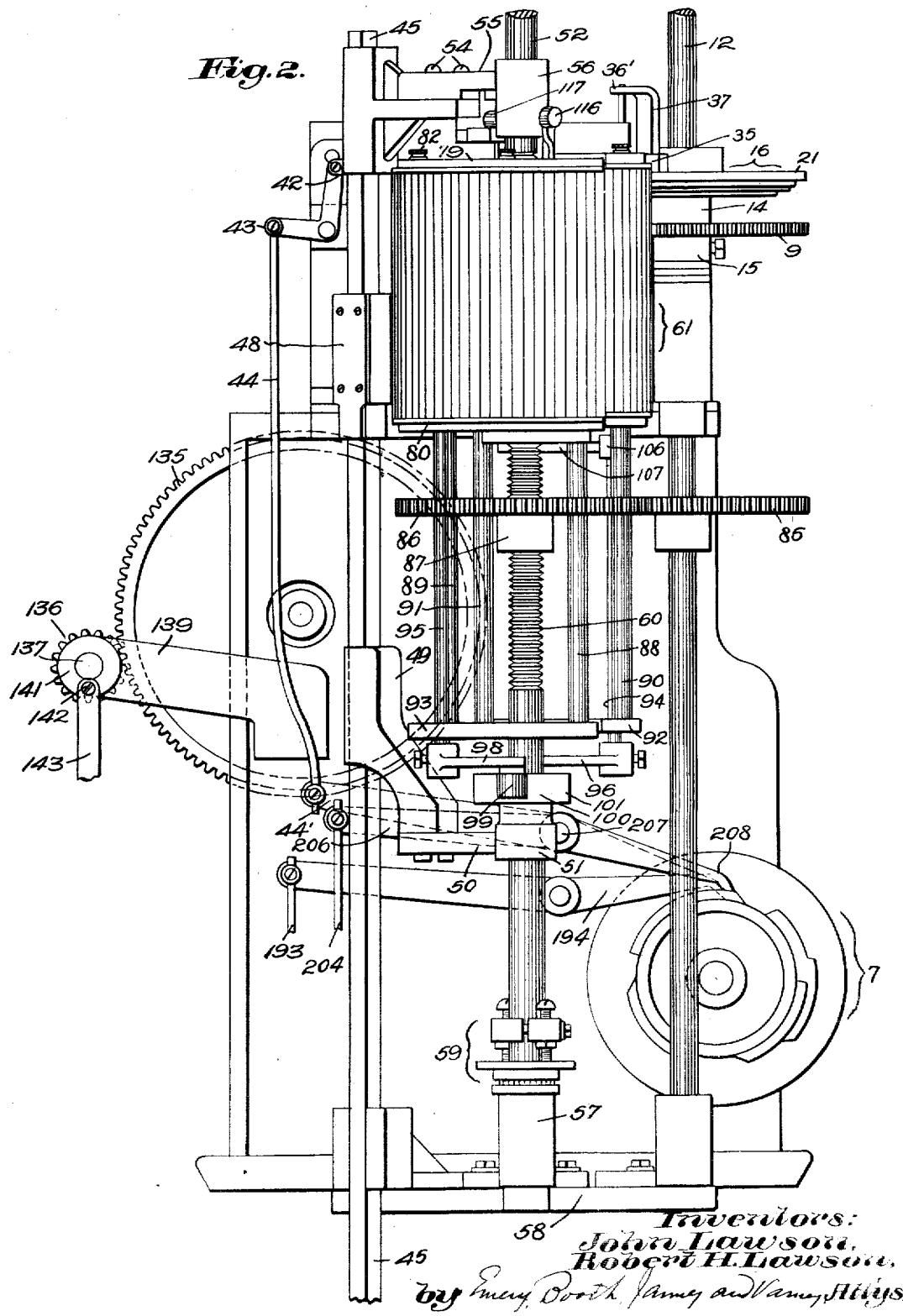

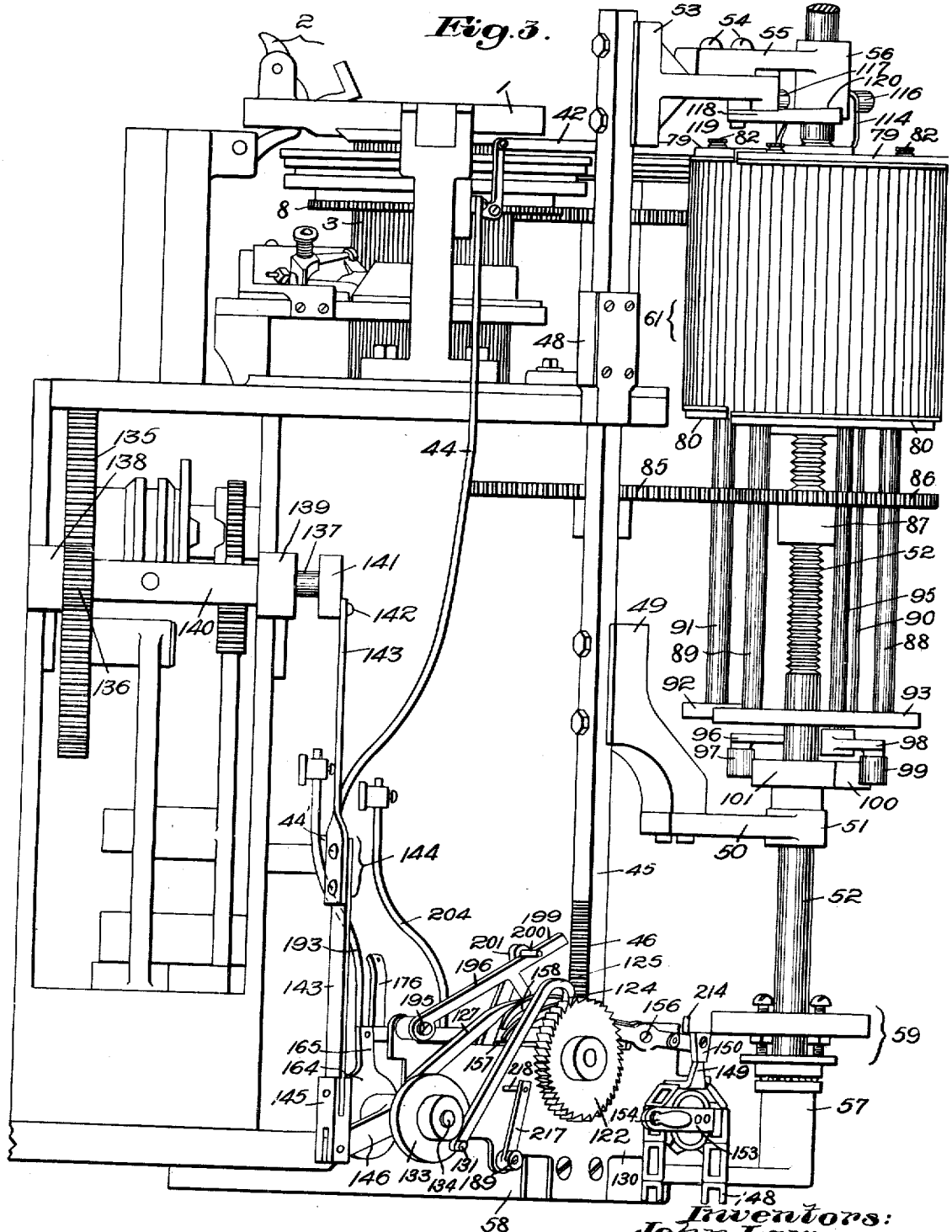

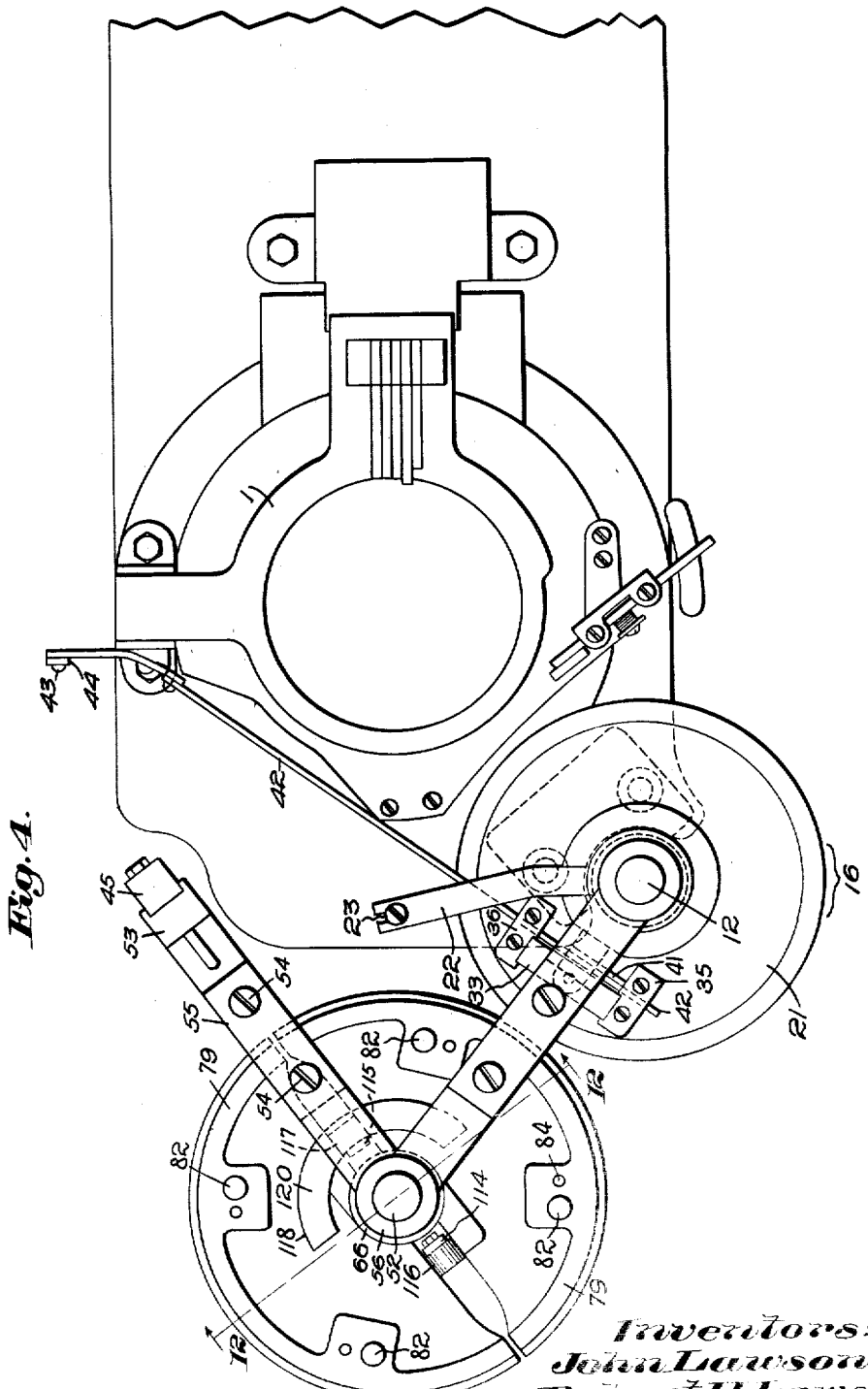

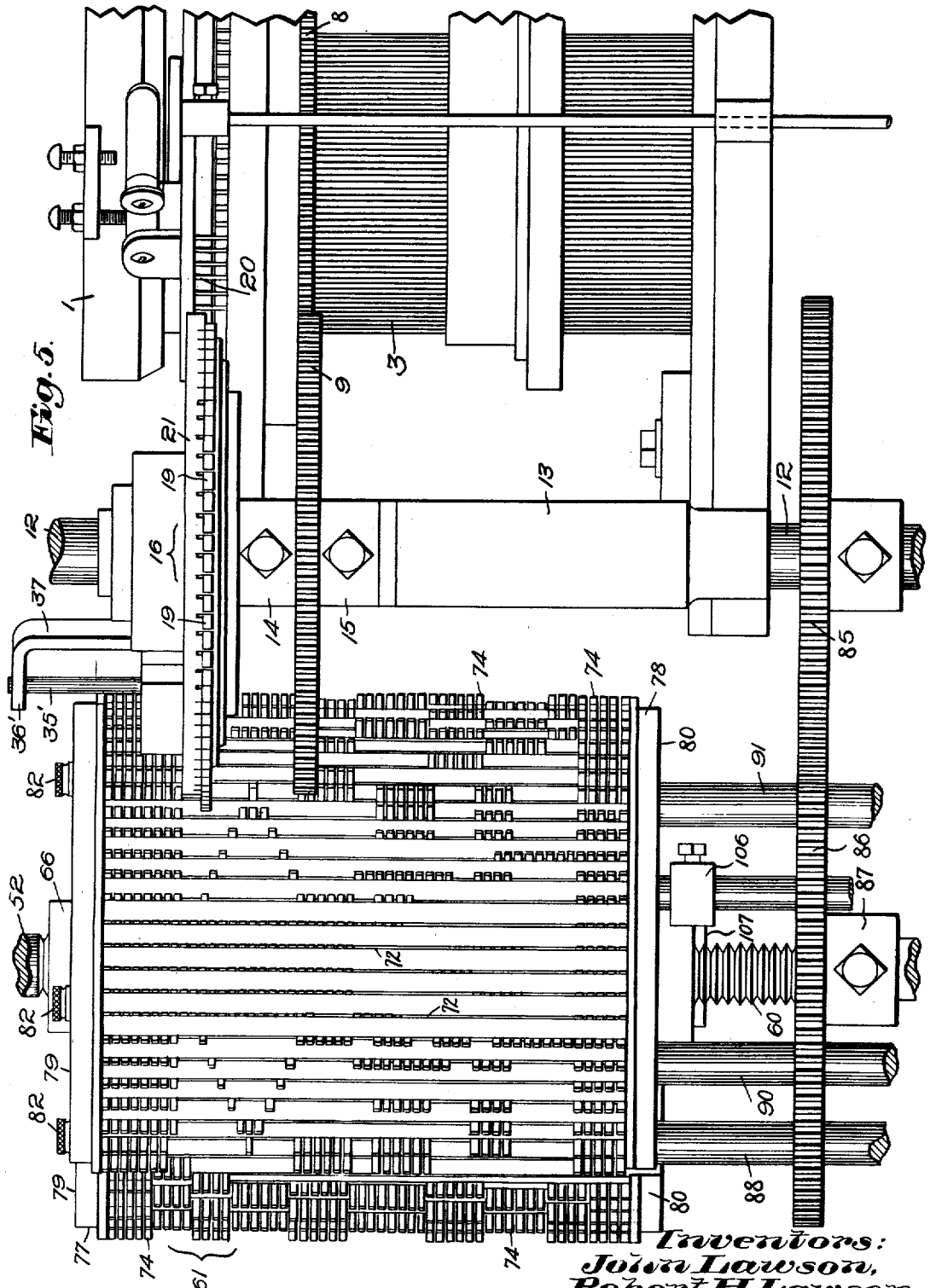

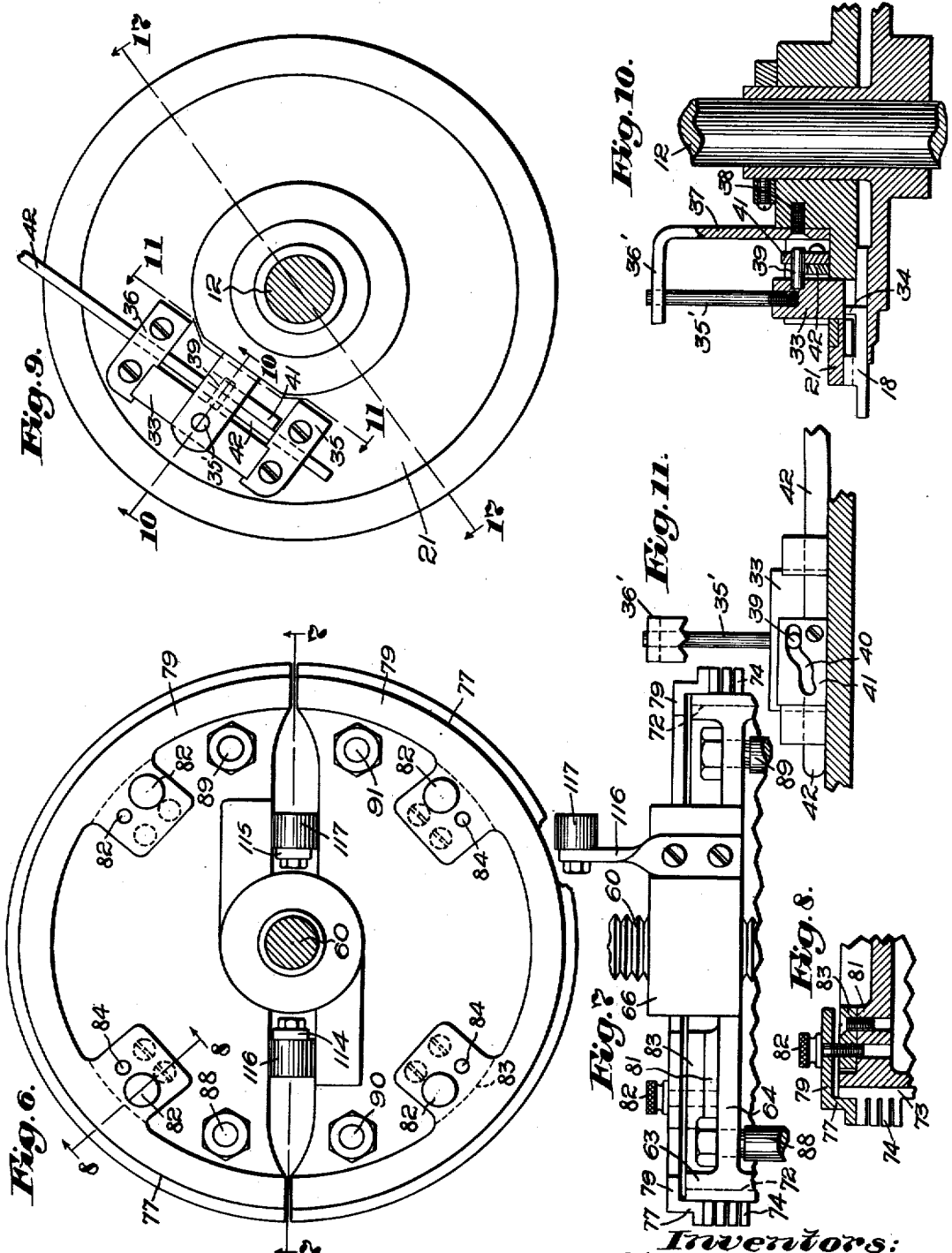

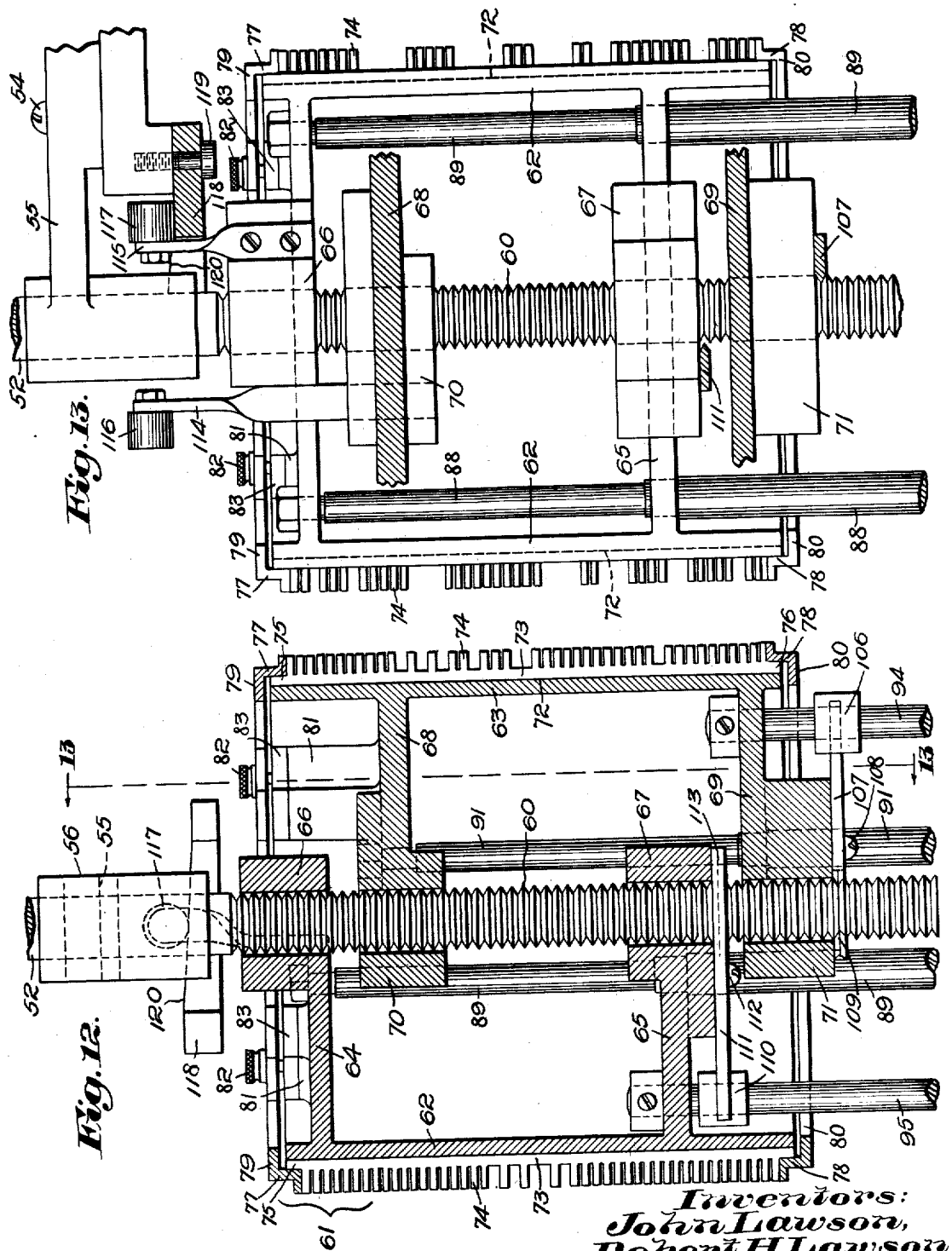

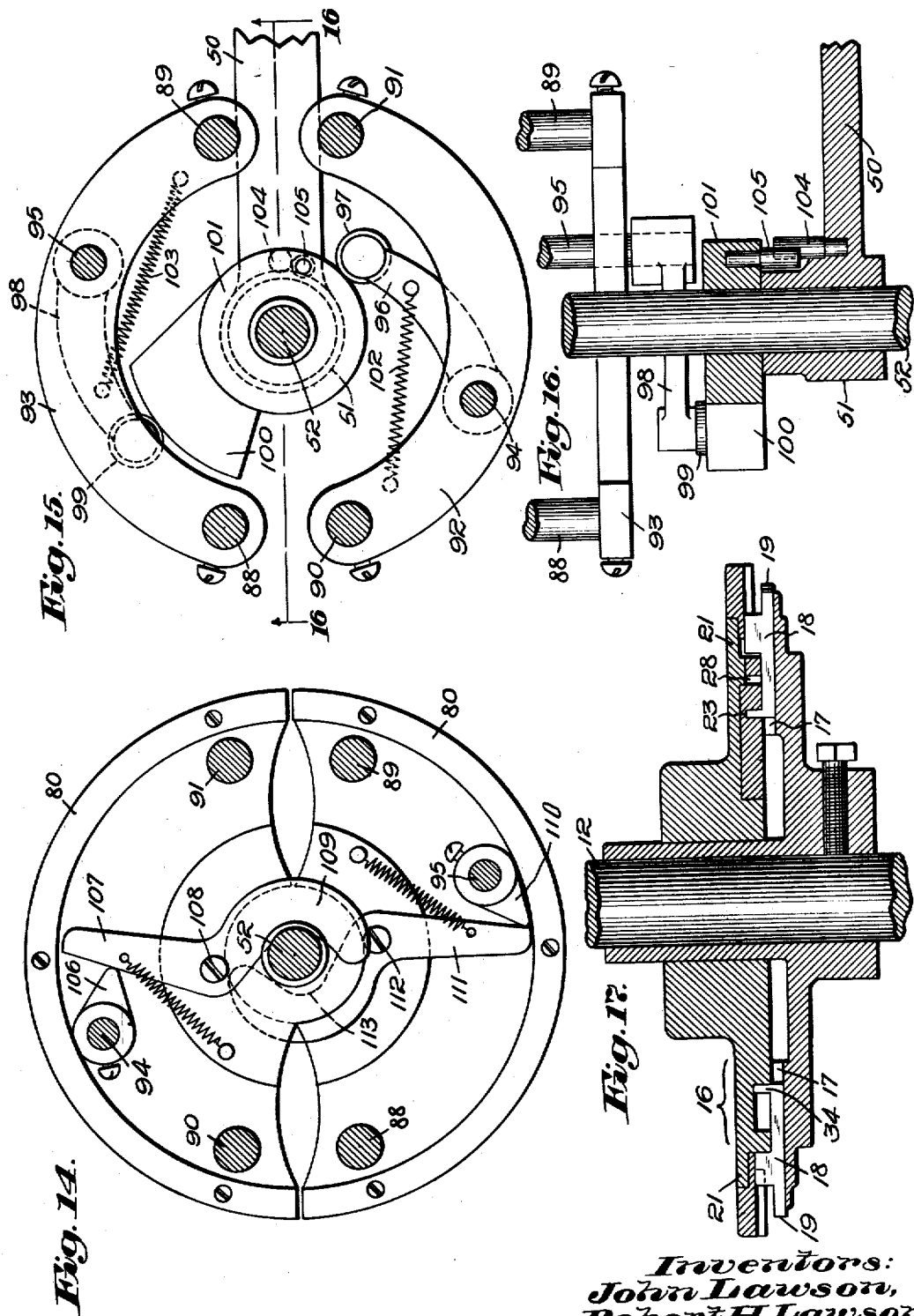

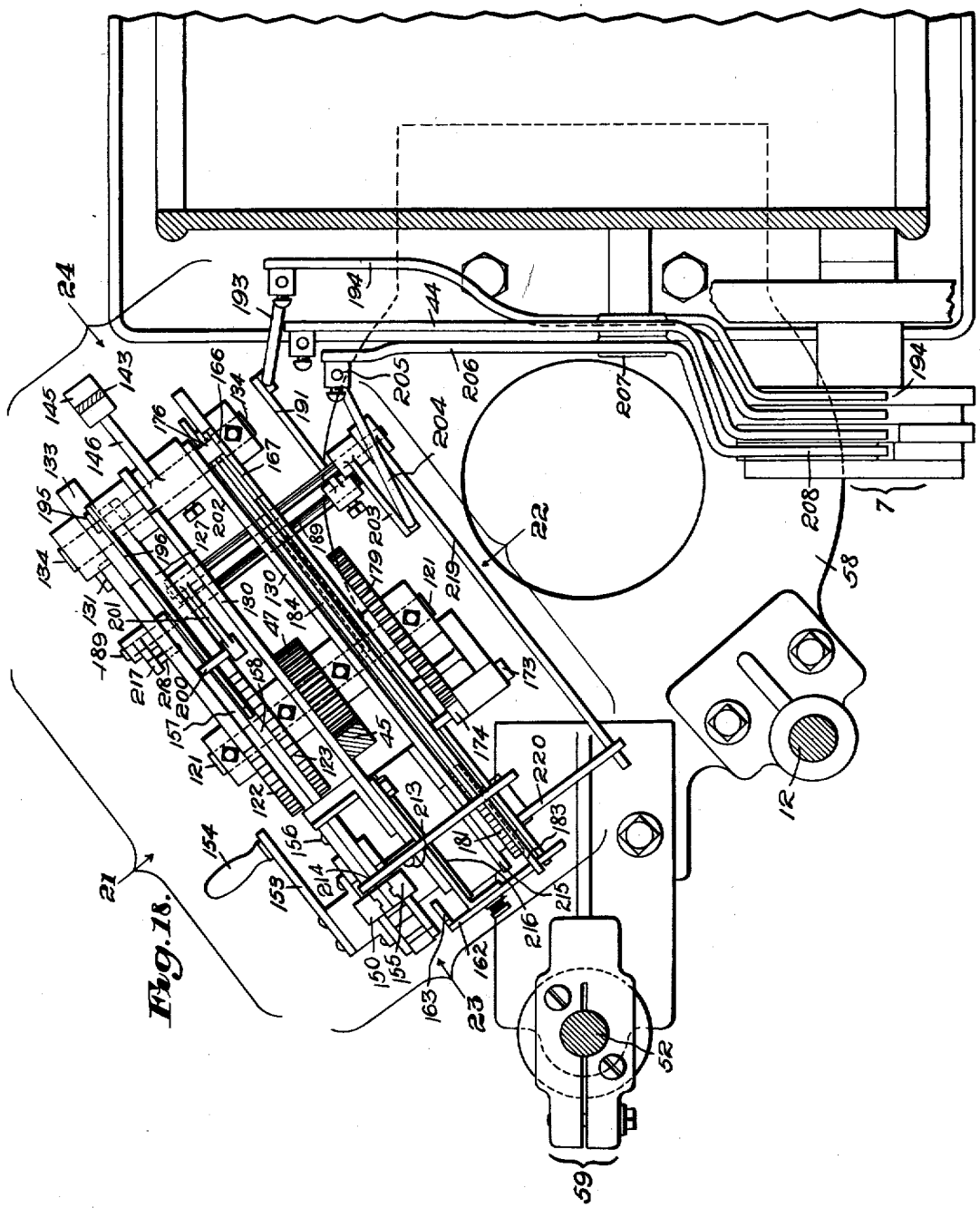

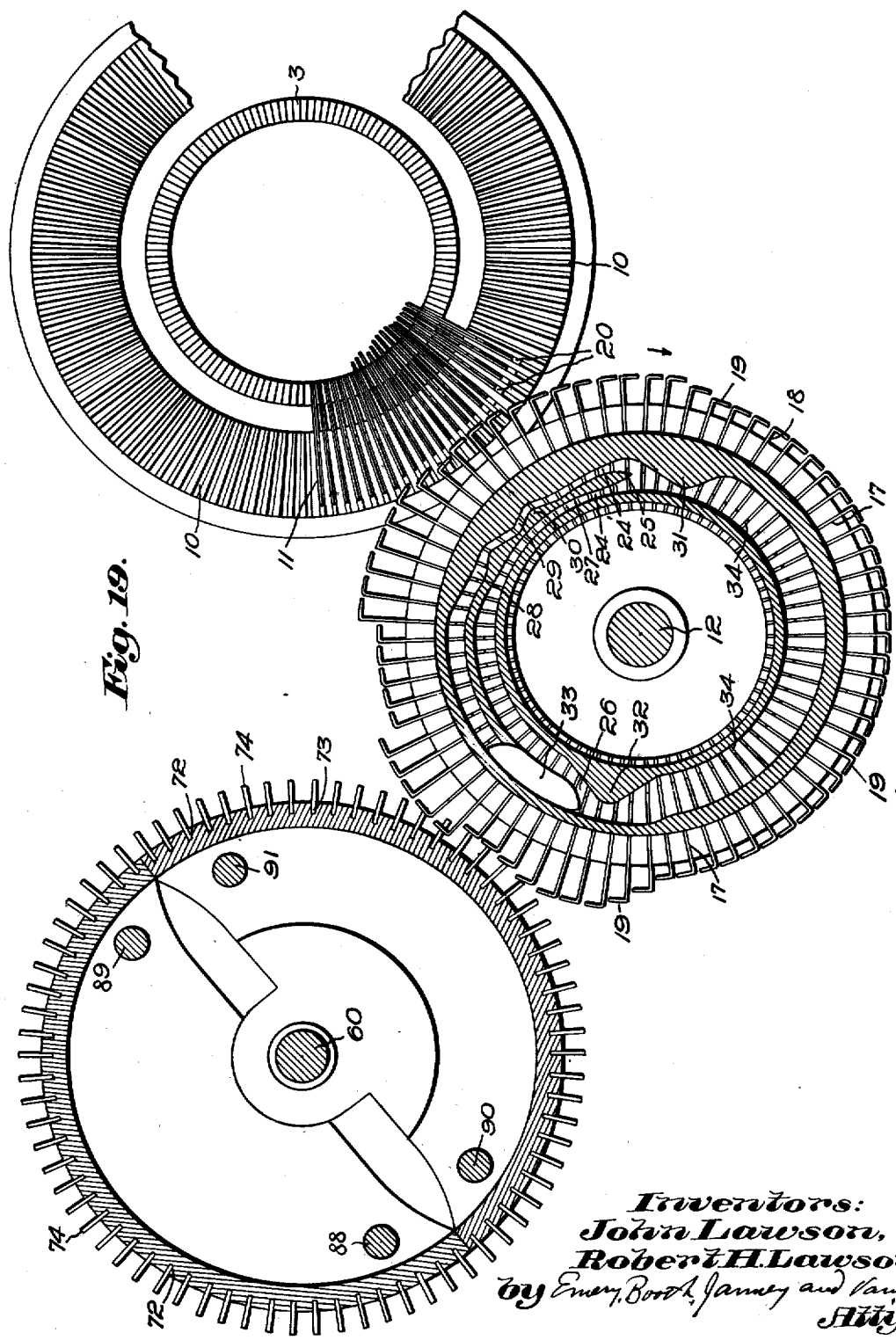

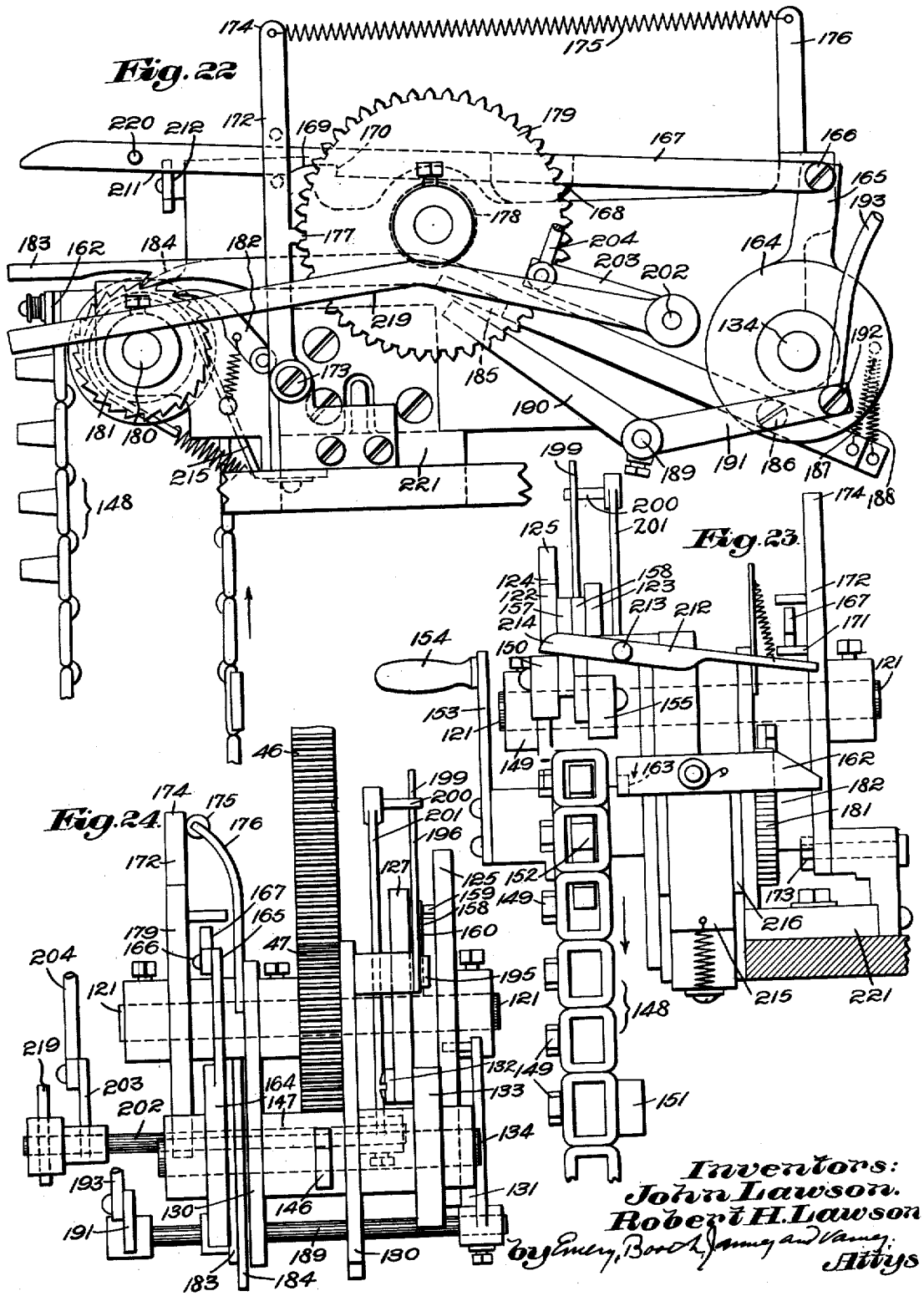

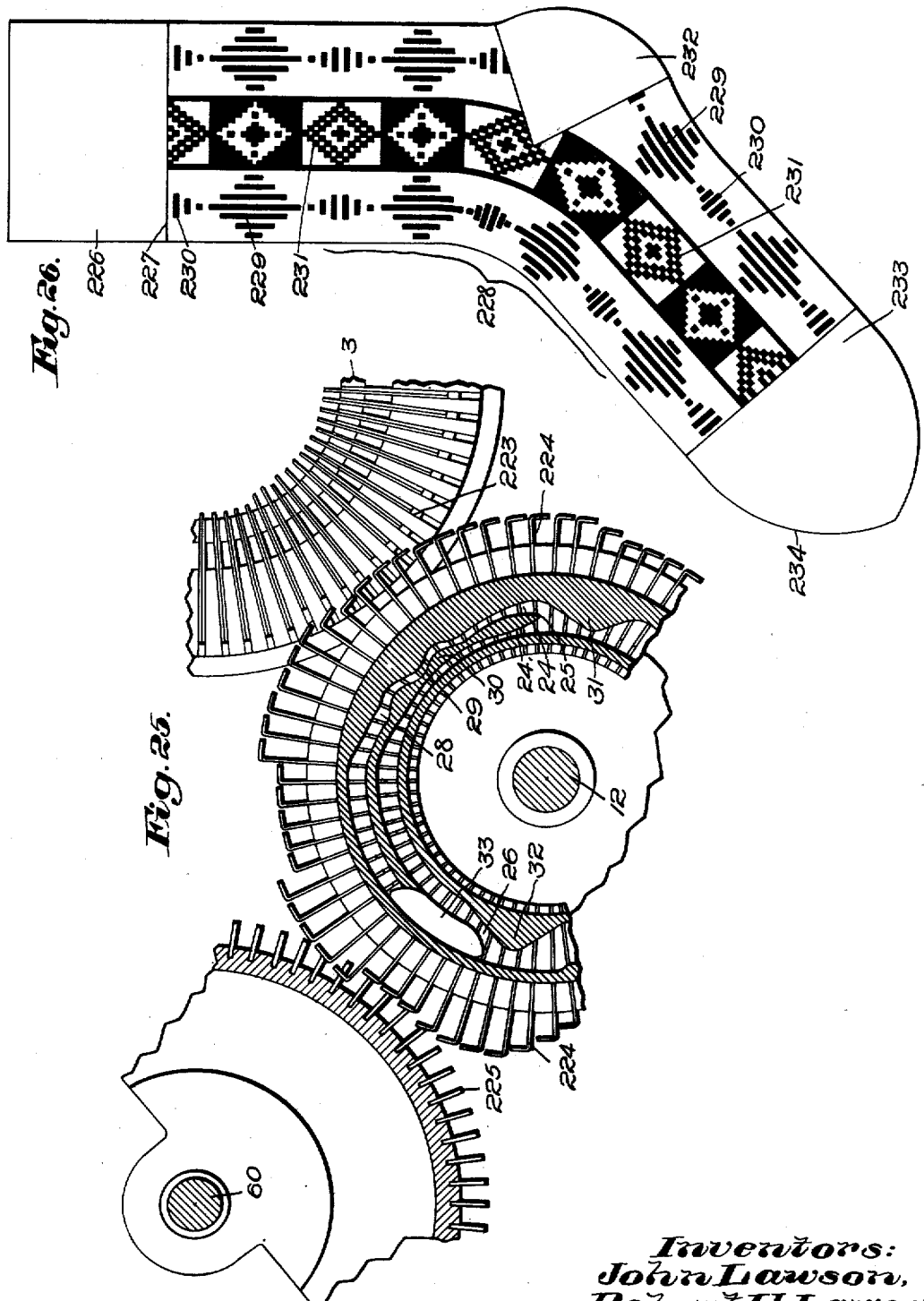

Patented Aug. 16, 1932

1,872,598

UNITED STATES PATENT OFFICE

JOHN LAWSON AND ROBERT H. LAWSON, OF PAWTUCKET, RHODE ISLAND, ASSIGNORS TO HEMPHILL COMPANY, OF CENTRAL FALLS, RHODE ISLAND, A CORPORATION OF MASSACHUSETTS

JACQUARD PATTERN MECHANISM FOR KNITTING MACHINES AND METHOD OF PATTERNING EFFECTED THEREBY

Application filed April 8, 1927. Serial No. 182,060.

This invention relates to jacquard pattern mechanism for knitting machines, as well as to the method of patterning effected thereby and the resulting fabric.

In order that the principle of the invention may be readily understood, we have disclosed a single embodiment of the mechanism of our invention in the accompanying drawings, wherein—

Fig. 1 is a front elevation of the entire mechanism excepting for the driving pulleys and immediately associated parts;

Fig. 2 is an end elevation thereof;

Fig. 3 is a rear elevation thereof;

Fig. 4 is a plan view thereof;

Fig. 5 is a front elevation upon an enlarged scale of the upper part of the mechanism;

Fig. 6 is a plan view of the jacquard drum;

Fig. 7 is a vertical section upon the line 7—7 of Fig. 6 of the upper part of the jacquard drum;

Fig. 8 is a detail in vertical section upon the line 8—8 of Fig. 6;

Fig. 9 is a plan view of the dial disk carrying the jacks for operating upon the special instrumentalities in the sinker or web holder grooves;

Fig. 10 is a vertical section upon the line 10—10 of Fig. 9;

Fig. 11 is a detail in vertical section upon the line 11—11 of Fig. 9;

Fig. 12 is a vertical transverse section taken through the jacquard drum upon the line 12—12, Fig. 4;

Fig. 13 is an interior view of one section or part of the drum;

Fig. 14 is a view of the jacquard drum from underneath;

Fig. 15 is a horizontal section upon the line 15—15 of Fig. 1;

Fig. 16 is a detail in vertical section upon the line 16—16 of Fig. 15;

Fig. 17 is a vertical section taken through the dial disk on the line 17—17, Fig. 9;

Fig. 18 is a plan view of the pattern chain mechanism and controlling parts for imparting axial movements to the jacquard drum;

Fig. 19 is a horizontal section taken through the jacquard drum, the dial disk, and the upper part of the needle cylinder, and directly associated parts;

Fig. 20 is a plan view of the pattern chain mechanism shown in Fig. 18;

Fig. 21 is a rear elevation of the mechanism shown in Fig. 18 viewing the same in the direction of the arrow 21 in said figure;

Fig. 22 is a front elevation of the mechanism shown in Fig. 18 viewing the same in the direction of the arrow 22 in said figure;

Fig. 23 is a view of said mechanism looking toward the right in Fig. 18, in the direction of the arrow 23;

Fig. 24 is a view of said mechanism looking toward the left in said figure, in the direction of the arrow 24;

Fig. 25 is a detail in horizontal section showing the independent control of each needle from the jacquard drum; and Fig. 26 is a side elevation of a hose or stocking showing one of the patterns that may be produced in accordance with our invention.

This application is a continuation of our co-pending application Ser. No. 177,262, and shows in greater detail the mechanism shown in that application and also discloses pattern means for governing or controlling the movements of the pinion 30 of said application for imparting lengthwise movement in either direction and to any desired extent to the upright rack 29 thereof, whereby the jacquard drum is moved axially in either direction to any desired extent, dependent upon the dictation of the pattern chain, which represents the preferred embodiment of means for controlling or governing the axial movements of the said jacquard drum. We do not herein claim what is claimed in our co-pending application Ser. No. 177,262, the claims of said co-pending application being directed broadly to the jacquard irrespective of pattern means for imparting axial movement to the jacquard drum.

The jacquard mechanism herein disclosed may be employed in connection with various types of knitting machines and even in connection with mechanism other than knitting machines, examples of which it is unnecessary here to give. In its broadest application, therefore, the jacquard mechanism is of general application.

It is, however, particularly adapted to rotary knitting machines of the independent needle type, and more especially it is adapted for use in connection with seamless or circular knit hosiery machines. Therefore, without limiting the scope of the invention, we have chosen to represent the same as applied to a hosiery knitting machine of the general type shown in the patent to Hemphill, No. 933,443, and known upon the market as the Banner machine. By the jacquard control, any suitable or desired stitch variation may be effected, and thereby designs, figures, pictures, writing, etc. may be formed upon the knitted fabric. For example, such designs, pictures, etc. may be provided through the jacquard control of float threads, of tuck stitch work, of needle drop stitches, of sinker drop stitches, of reinforced thread stitches, or of plating and reverse plating. We have, without limiting ourselves thereto, chosen to illustrate our invention as employed for the purpose of controlling the production of plating and reverse plating in knitted fabrics, and particularly in seamless hosiery.

In effecting plating and reverse plating, we preferably but not necessarily employ the principles of operation disclosed in the patent to Robert H. Lawson, No. 1,605,896, and refer to that patent for a full disclosure of special instrumentalities and regular web holders, one of each of which is positioned in each of the grooves of the sinker or web holder ring. Relative movement of the needles and the said instrumentalities, and preferably movement of said instrumentalities transversely of the needle series, effects yarn or thread engagement, so that two plating yarns which are fed in a plating relation are reversed in position, desirably during the loop forming operation, so that the face or front thread appears at the back of the fabric, and vice versa, all as fully disclosed in said Patent No. 1,605,896.

As disclosed in said Lawson Patent No. 1,605,896, there is provided one or more dial disks (herein but one) of the general type shown at 44, 45 in said patent, for effecting the positioning of the disk instrumentalities. Desirably, however, instead of employing the precise form of dial disk shown in that patent, we provide a dial disk of the general type shown in our copending application Ser. No. 145,512, wherein are disclosed jacks positioned in grooves of the dial disk. The mechanism herein shown, however, so far as the dial disk is concerned, constitutes a marked advance in the art, in that the jacks of the dial disk are themselves movable in and out into inoperative and operative positions respectively, and thereby individually control the positions of the instrumentalities which directly engage the thread or threads to effect reverse plating.

By the mechanism shown in the patent to Lawson, No. 1,605,896, change from plating to reverse plating or the reverse may be effected at any wale of the fabric at will. While this is true of each wale so far as any one course considered alone is concerned, there are limitations in the action of the mechanism therein disclosed which prevent change from plating to reverse plating or the reverse at each and every loop of any course regardless of what has been done in each and every preceding course and regardless of what may be done in each and every succeeding course. An important object of the present invention is to provide means whereby, throughout an extended number of courses, change may be made from plating to reverse plating, or the reverse, at each and every loop or stitch throughout all of said courses, regardless of what has been done or is to be done at any of the other loops or stitches of any of said number of courses. In the mechanism shown, we have provided a jacquard drum or member of such height or length as to control all the stitches throughout forty-eight consecutive courses, assuming that the jacquard drum is racked continuously in one direction, one step for each course. If, however, the drum be not racked every course or if, at the end of a racking movement in one direction as far as possible, it be correspondingly racked in the opposite direction, it will be obvious that the number of courses controlled is greatly increased. The purpose of our invention (assuming merely for the purpose of description that the patterning or designing is effected by change from plating to reverse plating, or the reverse) is to provide figures of various sizes, or pictures, names, letters or other representations throughout a very extensive part of the stocking.

It will be understood that the jacquard drum can, in accordance with our invention, be made of such length as to receive a number of circumferential rows of formations, which number of rows shall equal the number of courses in the stocking exclusive of the heel and toe. In such case, it is not necessary to impart axial movement to the jacquard drum in either direction. Such a drum would, however, be of relatively great length. Therefore, to provide a more compact mechanism, we employ a jacquard drum of much shorter length than that just referred to, and move the said drum axially in one direction or the other to any desired extent, back and forth, all in accordance with pattern dictation, as will be disclosed in detail.

It is unnecessary to describe in detail the circular or seamless hosiery knitting machine to which we have represented the jacquard drum as applied. As shown most clearly in Fig. 1, the said machine is of the independent needle type, the needles being desirably latch needles. Therefore, a latch ring is employed as indicated at 1, and therein is supported a group of pivoted yarn or thread fingers generally indicated at 2, and including two separate yarn or thread fingers through which respectively two yarns are introduced in a plating relation as indicated most clearly in Fig. 30 of the patent to Robert H. Lawson, No. 1,605,895, and which therefore need not be more particularly referred to. Desirably but not necessarily greater tension is imparted to one of said threads than to the other, and desirably the greater tension is imparted to that thread which strikes the needles more quickly and lower down on the stems thereof, and therefore appears at the face of the fabric in normal plating.

The said machine, being of the so-called Banner type, is provided with a rotating needle cylinder 3 and with the usual cams, pickers, etc., which need not be particularly referred to. The machine is provided with a pattern shaft 4 upon which is mounted the usual pattern drum 5 having a series of cams thereon for controlling the yarn fingers through the usual operating levers and connections indicated in part at 6 in Fig. 1. The said cam shaft is also provided with other cam formations generally indicated at 7, by which other parts are controlled, among them being pawls or like members by which parts of the pattern chain mechanism, which in turn governs the axial movements of the jacquard drum, are operated, all as will be more fully described.

As most clearly shown in Fig. 5, the needle cylinder has fast thereon a gear 8 meshing with a gear 9. At its upper end the knitting machine is provided with a web holder or sinker bed ring having radial grooves therein, as indicated at 10 in Fig. 19. Each of the said radial grooves receives not only the usual web holder or so-called sinker, such as shown in the said Lawson Patent No. 1,605,896, but also receives a special instrumentality 11 of the general character shown in said Patent No. 1,605,896, said elements (namely, said web holders and special instrumentalities) being wholly disconnected from each other and capable of independent radial movement in the said grooves. For further description of the manner in which said special instrumentalities cooperate in effecting changes from plating to reverse plating, reference is directed to said patent.

For further disclosure of the manner in which the regular web holders and the special instrumentalities are controlled in their radial grooves for in and out movement, we make reference to our patent No. 1,720,649. As therein fully disclosed, we provide in the sinker cam ring three substantially concentric pathways, the innermost of which receives the butts of the regular web holders, which are moved in and out in the usual manner. The special instrumentalities are longer than the regular web holders, and the butts thereof are adapted to be received either in the outermost pathway or in the intermediate pathway. When said butts are in the outermost pathway, normal plating occurs at the needles corresponding thereto. A cam or other suitable means controls the communication between the intermediate pathway and the outermost pathway, so that when said instrumentalities are pushed inward by selecting means (such, for example, as the jacks in the dial cam to be herein described), the butts of such instrumentalities pass into the intermediate pathway and therefore cooperate to effect reverse plating at the needles corresponding thereto, all of which will be clearly understood by reference to said application and also by reference to said Lawson Patent No. 1,605,896.

The gear 9 is fast for rotative movement upon a spindle 12 of the general character shown at 22 in our co-pending application Ser. No. 145,512. The said spindle 12 is supported in a suitable bearing 13 mounted in the bed plate of the machine. We have stated that the gear 8 is upon the needle cylinder. It may, however, be provided upon the sinker cam ring or other rotating part, and it is to be understood that our invention is in no wise limited to a rotary needle cylinder type of knitting machine, which is illustrated as one application only of our invention.

Upon the spindle 12 are fast collars 14, 15, and fast upon the upper end of said spindle is a jack-receiving dial disk generally indicated at 16, which is in transverse alignment with the sinker cam ring substantially as indicated in our co-pending application Ser. No. 145,512. The said disk is rotated in a clockwise direction, as indicated by the arrow in Fig. 19, excepting at such times as the needle cylinder is reciprocated, as during the formation of the heel and toe. In the upper face of said disk are provided radial grooves 17, each of which receives a jack 18, the outer end whereof is bent at substantially right angles, though upon an arc, as indicated at 19. We have shown each of said bent ends 19 as of sufficient extent to engage and thereupon to move radially inward two special instrumentalities 20, so that their butts pass from the outermost pathway in which they are positioned during normal plating into an intermediate pathway for effecting reverse plating. It is clearly to be understood that each of said bent ends 19 may control but a single special instrumentality, in which case we would provide as many jacks 18 as there are special instrumentalities 5, and in Fig. 25, we have shown a single jack for each such special instrumentality. If the machine be of coarse gauge, we may and desirably do provide a single jack for each special instrumentality, as, for example, if there be one hundred and sixty such special instrumentalities or less. If, however, the machine be of finer gauge, we desirably employ one jack 18 for each two adjacent special instrumentalities 20. Our invention is not limited in this respect, as the number of jacks may be the same as the number of needles, or the number of jacks may bear any desired ratio to the number of special instrumentalities.

The said dial disk 16, having the radial grooves and the jacks 18, is rotated by the gear 9 under and with relation to a fixed cap 21, provided with suitable cams and pathways. The said cap 21 is held from rotation in any suitable manner, as by means of a bar 22, shown in Fig. 4, connected to the upper face of said cap and extending to a screw or stud 23 upon the frame of the machine. The said cap 21 is provided with an inner pathway 24, shown most clearly in Fig. 19, and an outer pathway 24' which communicates as indicated at 25, and also at a substantially diametrical point 26, as clearly shown in Fig. 19. Between said pathways 24, 24' is provided a cam or set of cam formations 27. The upstanding butts of the jacks 18 are adapted to be received in either of said pathways 24, 24'. If they are positioned in the innermost pathway 24, they are so withdrawn or positioned that in their movement past the corresponding instrumentality or instrumentalities 20, they do not act to move the latter from the outermost pathway thereof to the intermediate pathway, but leave them in said outermost pathway so that at the needles corresponding thereto, normal plating occurs. If, however, the butts of any jacks 18 are moved or guided outwardly, so that their butts run into the outermost pathway 24', the said jacks engage by their bent ends 19 a pair of special instrumentalities 20 and move the same inwardly in their grooves, so that their butts are positioned in the intermediate pathway hereinbefore referred to, and therefore reverse plating occurs at the needles corresponding thereto. The cam formation or shape of the cam member 27 is such that as the jacks 18, after passing the jacquard drum approach the sinker cam ring, they are drawn inwardly, if such jacks are in the outer pathway 24', so that they will not engage with the special instrumentalities 20 to which they do not pertain. The formation for effecting such inward movement is indicated at 28 in Fig. 19. Immediately thereafter, as indicated at 29, the said jacks in the outermost pathway 24' are forced outwardly so that their bent ends 19 directly engage the ends of two special instrumentalities (or one special instrumentality if the number of jacks 18 be the same as the number of special instrumentalities 20). Beyond the cam formation 29 is a formation 30 by means of which the jacks 18 are withdrawn, and circumferentially beyond said formation 30 is a cam 31 by which all of the said jacks 18 are moved inward to their greatest extent.

The said jacks 18 continue in their innermost position until in their travel they reach a cam 32 substantially opposite thereto and by which all of the jacks 18 are projected to their full extent for presentation to the jacquard drum. The formations upon said drum determine whether the said jacks 18 are to remain in their outermost position and therefore to engage special instrumentalities 20 and push the latter into their reverse plating position, or whether they are to be themselves pushed inward by the formations upon the jacquard drum, so that in the continued turning movement of the dial disk 21, such pushed-in jacks 18 do not engage their special instrumentalities 20, but permit said special instrumentalities 20 to remain in their outermost or normal plating position. Engagement between the corresponding formations upon the jacquard drum and the jacks 18 is effected at such a time in the turning movement of the dial disk 21 as to cause any such functioning formation of the jacquard drum to push the corresponding jacks 18 inward into the inclined opening 26 of the pathway 24, as indicated at the left hand side in the dial disk in Fig. 19.

We provide means whereby, during heel and toe work, the jacks 18 are all moved inwardly out of action, so that any of them will not be selected by the formations upon the jacquard drum. While for this purpose any suitable mechanism may be provided, we preferably employ a movable cam, such as indicated at 33 in Fig. 19, and which, when moved into one position (herein lifted), is thereby withdrawn into a non-functioning position, and the formations upon the jacquard drum consequently select jacks 18. If, however, said cam 33 be moved downwardly into position to engage the butts 34 of the jacks 18 (see Fig. 10), then all the jacks are, in the continued movement of the parts, withdrawn immediately into the inner pathway 24 after passing the cam 33, which in the present embodiment of the invention is stationary. In order to move the cam 33 automatically, we preferably employ the following mechanism.

As shown most clearly in Fig. 9, the said cam 33 is vertically slidable between two blocks 35, 36 fast upon the upper face of the dial cap 21. Upwardly extending from the cam 33 is a pin or short rod 35' which is guided by the bent end 36' of the bracket 37 secured to the hub of the cap 21 at 38. Secured to the side of the cam 33 is a horizontal pin 39 which takes into a cam shaped slot 40 in a slide 41 secured to the end of the rod 42. The rod 42, as shown most clearly in Fig. 4, extends across the upper end of the machine and is there connected to a bell crank lever 43, itself connected to a downwardly extending rod 44, which at its lower end is in operative relation through lever 44' with the pattern drum and is therefore operated at the commencement of the heel and again at the commencement of the toe, so as to move the cam 33 down into engagement with the butts 34 of the jacks 18. At the end of the formation of the heel and toe, the said cam 33 is lifted into non functioning position, and the selection of the jacks 18 by the formations upon the jacquard drum is continued.

Having thus described the arrangement of the jacks 18 and the effect of their movement from their innermost position, where they do not act upon their corresponding instrumentalities 20, into their outermost position where they engage their corresponding instrumentalities 20 and push them inward for effecting reverse plating (which change in position of the jacks 18 is controlled by the jacquard drum), we will now describe one form of jacquard drum or member which may be and preferably is employed for the purpose. Our invention is not limited to any particular form of jacquard controlling member, as it will be understood that any suitable means (desirably giving a true jacquard control of the jacks 18) may be employed. We prefer, however, to employ a drum and to rotate the same constantly in one direction, except during the formation of the heel and toe, when, of course, the said drum is oscillated in synchronism with the movements of the needle cylinder. Unless the drum be of sufficient length to provide an individual row of formations for each individual course of the stocking or other fabric, we employ means gradually to rack or move the drum step by step upward or downward in any varied relation of impulses, in accordance with the pattern carried by the drum, so that, in accordance with the desired pattern, the proper formations upon said jacquard drum may be presented to and act upon the jacks 18.

We provide the jacquard drum with any desired number of circumferential rows of projections or formations, each circumferential row corresponding to one course in the knitting operation, and, as already stated, it will be understood that the number of possible projections or formations in each such circumferential row may be the same as the number of needles in the knitting machine, so that each formation in each circumferential row of the jacquard drum controls a loop or stitch in that course. As already stated, in a knitting machine of coarse gauge we provide for as many projections in each row as there are needles in the needle cylinder, but in that form of the invention shown in Fig. 19, wherein the number of jacks 18 is but one half the number of special instrumentalities 20, the number of possible formations in each circumferential row of the jacquard drum is one half the number of needles in the needle cylinder. That is to say, the number of possible projections in each circumferential row of the jacquard drums is the same as the number of jacks 18 in the dial disk.

While the formation upon the jacquard drum may be of any suitable character, our invention not being limited or restricted in this respect, we preferably provide a number of strips, which are inserted in or applied to the circumference of the jacquard drum lengthwise of said drum, and upon each strip we provide for a number of projections, the total possible number representing the number of courses of the stocking or other knitted article that may thus be controlled, assuming that the drum is moved or racked lengthwise for each revolution of the needle cylinder. If each such strip had all the possible projections thereon, it would follow that in each course the corresponding jack would be moved inward viewing Fig. 19 and hence the corresponding pair of special instrumentalities 20 would remain in their outer position and normal plating would result. If, however, one or more projections is or are removed from any one strip, such removal results in reverse plating at the needles corresponding thereto in the course or courses where such projection or projections is or are removed, all of which will be evident from the foregoing description.

We have stated that the jacquard drum is constantly rotated in one direction. It is, however, important that while projections upon the jacquard drum are acting upon the bent ends 19 of the jacks 18, there be no movement of said projections in a lengthwise direction. Since, however, the jacquard drum is itself to be racked or moved one step for each course of the knitting operation (unless the requirements of the pattern are such as to prevent a lengthwise movement of the drum upon the completion of any given course), it follows that the problem is presented of holding the functioning projection or projections upon the jacquard drum stationary (except for rotative movement of the drum) while said projection or projections are in engagement with the corresponding jacks 18, but at the same time providing for moving the jacquard drum sufficiently, so that in the next course the next row or next desired row of circumferentially extending projections upon the jacquard drum come into functioning engagement with the jacks 18. In the present embodiment of our invention, we have solved this problem by forming the drum in a plurality of segments, each of the full length of the drum, each segment whereof any formations are at a given instant engaging jacks 18, being held stationary, except in a rotative sense, at said given instant. In the present embodiment of the invention, we provide two such segments, each of which therefore embraces one hundred and eighty degrees of the drum, and we provide means whereby the segment any of whose projections are in engagement with jacks 18 is at such time of engagement held from lengthwise movement while continuing the turning movement. At the same time the other segment is being racked or moved step by step according to the dictates of the pattern. When the first mentioned segment has passed in its rotating movement far enough so that none of its projections is in engagement with a jack 18, that segment at once comes under the control of means for racking the same in the required direction, the other segment now being held from a racking movement, because certain of its formations are now brought into engagement with certain of the jacks 18.

We desire it to be understood that the segments into which the jacquard drum is divided need not be of equal peripheral extent and that the number of segments may be two or more. So far as we are aware, we are the first to employ, in a jacquard drum or like member, a plurality of segments or parts carrying formations or projections in such a manner that each segment or part, when its formations or projections come into functioning relation with jacks or equivalent parts, is held against lengthwise movement, though continuing its rotative movement.

Any suitable means may be provided to impart axial movement to the jacquard drum or member. For the purpose we have, however, in Fig. 3 and elsewhere, represented an upright bar or rack 45, the teeth 46 whereof are engaged by the teeth of a pinion 47. In accordance with our invention, a pinion 47 is moved in one direction or the the other to the extent desired in each direction by pattern mechanism of any suitable character, which is preferably automatically controlled. In the preferred embodiment of the invention the said pattern mechanism includes a pattern chain of such length as to control the to and fro movements of rotation of said pinion 47 throughout the entire formation of the stocking, excepting the heel, and desirably excepting the ring toe, also excepting the toe and the looper courses. If the hose or half hose which is being formed be provided with a ring top of plain knitting or a transferred rib top, then the control of the movements of the jacquard drum would commence with the first course following the ring top or rib top. The pattern chain by which the movements of the pinion 47 are controlled is preferably of just sufficient length to take care of the formation of a single stocking or hose, as will be more fully described hereinafter.

It will be understood that, according to the dictation of the said pattern chain or member, the pinion 47 will be constantly moved in a step-by-step manner in one direction or the other, and such step-by-step movement may be suspended for any desired number of courses, or movements in opposed directions and to any desired extent, may be interposed as desired, all in accordance with the pattern control. The result is that the pattern drum as a whole is racked or moved step-by-step from one end to the other if desired, and then moved in a reverse direction back of the starting point, or any variation or modification of such step-by-step movement may be employed.

Assuming for purpose of illustration merely that the jacquard drum has forty-eight circumferential rows of projections, a constant step-by-step movement of the rack 45 in one direction would control each stitch in each of said forty-eight courses without any unnecessary duplication of the pattern to any extent whatever throughout the forty-eight courses, and upon similar return movement of the drum, whatever pattern was produced during said forty-eight courses, is produced in a reverse direction in the next forty-eight courses. The possibilities of the invention are therefore practically unlimited.

The rack 45 is suitably supported for lengthwise movement in a guide 48, and near its lower end, as shown in Fig. 3, the said rack has secured thereto a bracket 49, an arm or extension 50 whereof encircles at 51 a shaft 52. At or near its upper end the said rack 45 has secured thereto a bracket 53, to which with capacity for lengthwise adjustment by slots and bolts, as indicated at 54 in Fig. 3, is secured a bracket 55. A hub 56 of said bracket encircles the said shaft 52, and said shaft is stepped in a bearing 57 which is secured to the frame of the machine at 58. At its upper end the said shaft 52 is received in suitable bearings carried by a bracket or brackets on the framing of the machine. As shown most clearly in Fig. 3, we provide means, shown generally at 59, whereby the vertical position of the said shaft 52 may be adjusted with great delicacy.

The said shaft 52 is provided with any suitable number (as, for example, forty-eight or more) circumferential grooves or notches 60, as indicated most clearly in Fig. 12. The said shaft 52 is not strictly speaking a threaded shaft, although it may be defined as a shaft the threads whereof are of zero pitch. The purpose of the said grooves or notches is to provide for engagement therewith one after another of a jaw or other suitable mechanism of which one is provided upon each half or segment of the drum. In the present embodiment of the invention where two segments are employed, there are provided two jaws or holding members, and in the present embodiment of the invention, so long as either jaw is in engagement with one of the grooves 60, that half or segment of the drum remains without racking movement, but the shifting of that jaw into engagement with another groove 60 occurs as the increment of racking movement referred to ceases.

The jacquard drum as a whole is indicated at 61 in the several figures, and the two segments or halves of the drum are indicated at 62, 63 in Fig. 12 and elsewhere. The segment 62 is provided with two inwardly extending, preferably semicircular, webs or flanges 64, 65 terminating at their inner ends in hubs 66, 67 encircling the said shaft 52. The segment or half drum 63 is provided with inwardly extending webs 68, 69 terminating in similar hubs 70, 71 also encircling the shaft 52, all as clearly shown in Fig. 12.

The outer surface of the entire drum is lengthwise grooved, as indicated at 72, in a manner generally similar to a needle cylinder, and in each of said grooves is positioned a strip 73 having in the present instance forty-eight possible projections or formations 74 slightly spaced from each other a distance corresponding with the distance between one course and the next in the fabric. The said strips 73 may, for convenience of description, be referred to as jack selector strips. Such strips may be of any suitable material, but are preferably of metal, and according to the design or pattern, those projections 74 which are not employed are cut away before the strip is positioned. It will be understood that the pattern may be conveniently laid out by providing a board having a number of grooves corresponding to those upon the drum, and the strips 73 may be inserted in said board temporarily and the formations 74 that are not to be employed in the fabric are then cut away. The said strips are then transferred in proper order to the grooves of the jacquard cylinder.

It will be evident that the strips 73 must be and are very accurately relatively positioned in their respective grooves 72, so that the corresponding projection 74 for each course of the fabric are in exact circumferential alignment. Each of said strips 73 has an upper reduced end 75 and a lower reduced end 76, which are respectively engaged by the flanges 77, 78 of semicircular caps 79, 79, 80, 80, which are secured to the ends of the drum by suitable screws or otherwise, as most clearly indicated in Fig. 6, after all of the strips have been positioned.

After the strips have been positioned upon the drum, it is unnecessary to remove the two semicircular cap pieces 80, 80, but in order to permit removal of such strips and the insertion of others in accordance with another pattern, we provide means whereby the semicircular cap portions 79, 79, may be readily removed. Such construction is illustrated in Figs. 6, 7, and 8. The webs 64, as well as the body of the drum and the other webs thereof, are preferably of some light material, such as aluminum, and on the web 64 is formed a series of bosses 81, shown as four in number in Fig. 6, into which are tapped a corresponding number of screws 82 which preferably pass through tapped openings in small steel plates 83 to prevent wear. Preferably also dowel pins 84 are provided to permit the accurate replacement of the semicircular cap pieces 79, 79.

Any suitable means may be provided to rotate the jacquard drum 61. For the purpose we have herein represented, in Fig. 5 and elsewhere, the gear 85 fast upon the rotating spindle 12. The said gear 85 meshes with and drives a gear 86 which, by means of hub 87 or otherwise, is made fast upon the shaft 52, so as constantly to rotate in one direction. The gear 86 has a series of openings extending therethrough for the reception of a corresponding series of rods, four of which are shown in Figs. 3, 14, 15 and elsewhere, at 88, 89, 90, 91. The rods 90, 91 are secured at their lower ends to a segment 92, and the said rods 90, 91, pertain to one of the segments or halves of the jacquard drum 61. The other segment or half of the jacquard drum has connected thereto the rods 88, 89 which, at their lower ends, are connected to a similar segment 93. Respectively pertaining to the two drum segments are provided rods 94, 95. Upon the lower end of said rod 94 below the segment 92, as indicated most clearly in Fig. 15, is fast a lever arm 96 having at its free end a roll 97. Fast upon the lower end of the rod 95 is a similar lever arm 98 having at its free end a roll 99. The said rolls 97, 99 are adapted to engage in turn, in the rotation of the jacquard drum 61 and the segments 92, 93, with a cam 100 carried by or formed with a hub 101 supported by the bracket 51, shown in Fig. 3, so that as the rack or bar 45 moves up or down, the hub 101 and its cam 100 move up and down therewith. The action of the cam 100, which is relatively stationary, is to cause each lever arm 96, 98 in turn to swing outwardly, and as soon as each roll 97, 99 rides past the cam 100 the arm 96 or 98 is moved inwardly by a suitable tension spring 102, 103 connected thereto and to the framing of the machine.

It has been stated that the jacquard drum 61 rotates continuously in one direction through the gears 85, 86. By this, it is to be understood that the said jacquard drum 61 rotates in synchronism with the needle cylinder, and therefore when the needle cylinder is reciprocated in the formation of the heel and the toe, the said jacquard drum 61 is correspondingly reciprocated. Viewing Figs. 15 and 16, it will be noted that the stationary hub 51 is provided with a stop pin 104. The hub 101 rests loosely upon said hub 51, it not being fast to the shaft 52. In the constant rotation of said shaft 52 the pin 104 is engaged by a depending pin 105 carried by the hub 101 and thereby said hub 101 is held from rotation. In the oscillating movements of the jacquard drum 61 during heel and toe work, the friction between the hub 101 and the shaft 52 is sufficient to cause said hub 101 with its pin 105 to swing or oscillate from side to side and in each oscillating movement to contact with one side or the other of the pin 104, which therefore prevents further turning movement of the hub 101. The purpose of the cam 100 and the arms 96, 98 is to control two jaws or members, one pertaining to each segment or part 62, 63 of the jacquard drum, which jaws are respectively brought into engagement with some notch or groove 60 in the shaft 52 or removed therefrom, it being understood that one of such jaws, and only one, is in engagement at any given time with a notch or groove 60 upon said shaft 52, so that the corresponding segment or part of the jacquard drum is held stationary in a lengthwise sense, but is permitted to continue its rotation.

The rod 94 extends upward to the lower end of the jacquard drum 61, and has fast thereon an arm, cam or tappet 106, shown most clearly in Fig. 14, which is in engagement with an arm 107 of a lever pivoted at 108 to the hub 71, as shown also in Fig. 12. Said lever is continued past the pivotal point 108 and is provided with a jaw 109, which in the position shown in Fig. 14 is in a locked condition; that is to say, its edge is in engagement with one of the notches or grooves 60 upon the shaft 52. Therefore the segment or path of the drum 62 is in position to be racked or moved axially. The said arm, cam or tappet 106 is moved by the cam 100 so that it periodically swings the lever 107 upon its pivot 108 against the tension of the spring 102, so as to lock the jaw.

On the corresponding rod 95 is an arm, cam or tappet 110 which is in engagement with a lever arm 111. The said lever is pivoted at 112 upon the hub 67 (see Fig. 12) of the other drum segment 62, and is provided with a jaw 113 which, as shown in Fig. 14, is out of engagement with the circumferential grooves or notches 60 of the shaft 52, whereby said segment 62 is not held against axial movement for the time being. The arm, cam or tappet 110 similarly periodically effects the release of the jaw 113 from a groove or notch 60 through the action of the cam 100. It is to be understood that in each rotation of the entire drum the jaws 109 and 113 are respectively in engagement with respective grooves or notches 60 during half each revolution. The lever arms 107, 111 are spring held in unlocked position.

Any suitable means may be provided to impart an incremental movement to each half or segment 62, 63 of the drum 61 in turn. In other words, in each rotation of the jacquard drum 61 one half of the drum is temporarily under the influence of means to give it an incremental advance or retardation, and then under the influence for the second half of such rotation, of means whereby it is locked to the shaft 52 and is thus held against axial movement.

Each such drum segment is provided with an upwardly extending rod or arm, and the two rods or arms are shown at 114, 115 in Fig. 13 and elsewhere. The said arms carry rolls 116, 117, and each said roll is, in the rotation of the jacquard drum 61, received upon a substantially semicircular runway or cam 118, which is secured as indicated in Fig. 3 at 119 to the under side of the bracket 53. The upper face of said runway is sloped as indicated at 120, and such slope is just sufficient to elevate the corresponding segment of the drum so as to bring the next circumferential row of projections 74 into transverse alignment with the jacks 18.

At or substantially at the time when a roll 116 or 117 passes off the sloping face 120 of the runway 118, the supporting jaw pertaining thereto is released and snaps into the next circumferential groove or notch 60. The cam 120 obviously does not raise either drum section after the jaw for that drum section has snapped into its supporting notch or groove 60. Each roll 116, 117 drops off the sloping face 120 of the semicircular runway 118 not later than the time of entry of the jaw for that drum section into the next supporting notch or groove 60.

We have stated that the rack 45 is moved up and down incrementally or step-by-step and to the desired extent in either direction by reason of pattern controlling means acting upon or cooperating with the pinion 47. Any suitable pattern controlled means may be employed for this purpose, and as the preferred embodiment of means for that purpose we have disclosed the mechanism shown in detail in Figs. 20 to 24 inclusive. Our invention is not limited to the employment of the particular mechanism shown, but that has been selected as the preferred embodiment of means for accomplishing the purpose stated, and will now be described without limiting the invention thereto.

The pinion 47 is fast upon the shaft 121 and also fast thereon are two ratchets 122, 123, the teeth of which respectively face in opposite directions. With the teeth of the ratchet 122, engages the tooth 124 of a pull pawl 125, and with the teeth of the ratchet 123, engages the point 126 of a push pawl 127. Said pawls have springs 128 and 129 to hold them in engagement with their respective ratchets, and are respectively pivotally connected at 131, 132, to a disk 133 fast upon a shaft 134 mounted in the framing and adapted to be rocked in opposite directions in any suitable manner.

Preferably we oscillate or rock the shaft 134 from the "104" gear of the knitting machine. The said gear is clearly represented at 135 in Fig. 3. As well known, said gear, which has 104 teeth, rotates once to four revolutions of the needle cylinder. We provide a pinion 136 meshing with gear 135 and having twenty-six teeth, so that said pinion rotates once to each revolution of the needle cylinder. The said pinion 136 is mounted on a shaft 137 in bearings 138, 139, provided upon suitable brackets on the frame of the machine and desirably a sleeve 140 surrounds a portion of the said shaft as represented in Fig. 3. Upon the inner end of the shaft 137 is fast a crank disk 141 and pivoted thereto at 142 is a connecting rod 143 having a lengthwise adjustable portion as indicated at 144. The lower end of said connecting rod is suitably connected to a block 145 to which is also connected, and as herein shown at an angle thereto, a link or rod 146 having at its end a hub 147 (see Fig. 24) wherein is fast the shaft 134.

It will be understood that throughout the rotation of the needle cylinder the crank disk 141 is moved so as through the disk 133 to reciprocate the pawls 125, 127, thereby to turn said ratchets. Both of said ratchets are fast upon the shaft 121 and one or the other of said pawls 125, 127, is constantly out of engagement with its ratchet, and at times both of said pawls are held out of engagement therewith by pattern governed means to be described. The direction of rotation of the pinion 47 and the extent to which it is moved in either direction depends upon which pawl is in driving relation to its ratchet.

In order to control the pawls 125, 127, there is provided a suitable pattern chain, a portion only of which is represented at 148 in the several figures. The said pattern chain is endless and is composed of a large number of links, and the said chain is supported about a suitable number of sprocket wheels carried by the framing of the machine. The said links are provided with suitable projections, some upon one edge and some upon the opposite edge, so that they may operate respectively upon the end of suitable members which themselves hold the pawls 125, 127 out of operation or permit them to engage their ratchets. Certain of said projections upon the left hand side of certain of the links are represented at 149 in Fig. 23, and one of said projections is indicated as in engagement with and lifting the end 150 of one of said members.

The pattern chain 148 is adapted to be moved step-by-step in the direction of the arrow shown in Fig. 23, and the wide lateral projection 151 represents the end or last part of the pattern chain so that the next link therebelow in Fig. 23 represents the first acting link of the chain for the commencement of the next stocking or the part thereof just below the ring top or transferred rib top. The length of the pattern chain 148 is desirably just sufficient for the formation of a single stocking, and therefore the jacquard drum is under the control of the said chain from the very commencement of said stocking, or rather from the commencement of that part of the hose or stocking which is just below the so-called ring top, or the transferred rib top if the latter be employed. The said chain controls the movements of the said jacquard drum throughout the leg and the foot. During the formation of the heel the jacquard drum does not control reverse plating, as the heel is made from its own thread or threads, and the same is true with respect to the toe and the so-called ring toe, as well as the looping courses. The chain is preferably of such length that it is stationary during the formation of the heel, but is being driven during the formation of the toe so as to use up the entire chain coincidently with the completion of the toe.

The said pattern chain 148 extends over a sprocket wheel 152 shown in Fig. 21 and elsewhere. Upon the hub of the said sprocket wheel 152 is provided a crank arm 153 having a handle 154 so that the pattern chain may be turned by hand when desired.

In Figs. 21 and 23, one of the lugs 149 upon the left hand edge of the pattern chain is represented as under and as having lifted the end 150 of one of the members or levers which control the pawls 125, 127. The end 155 of the other member is represented in Fig. 23 as in the non-lifted position. The two members referred to and which determine whether or not the pawls 125 and 127 shall engage the teeth of their respective ratchets, are pivoted at 156, as shown most clearly in Fig. 21 upon the framing of the machine, or bracket 130 attached thereto. The forward end of one of said levers is represented at 157, and the forward end of the other is represented at 158. They are adapted respectively to take under a pin 159 on the pawl 125 and a pin 160 upon the pawl 127. When the end 150 of the member or lever 158 is upon a lug 149, then the pawl 125 is permitted in its to and fro movement to engage the teeth of the ratchet 122 and to rotate the same in a contraclockwise direction viewing Fig. 21. When, however, a suitable lug comes under the end 155 of the lever 158, then the long end of said lever is depressed and the pawl 127 is permitted to engage the teeth of its ratchet 123 and turn the same in a clockwise direction viewing Fig. 21. Thus depending upon the lugs on the pattern chain 148, the pinion 47 is turned incrementally and to the desired extent in one direction or the other, thus elevating or depressing the jacquard drum through its rack 45.

The members or levers 157, 158 are provided with suitable springs connected thereto and to the framing or bracket 130, one of said springs being represented at 161 and thereby said levers are held in operative relation to the pattern chain 148.

As shown most clearly in Figs. 20 and 23, there is provided upon the framing a lever 162, the end 163 thereof is adapted to be engaged by the laterally extending final or special lug 151 of the pattern chain 148. The said lever 162 is adapted to control certain parts to be described, and in so doing is moved in the direction of the arrow thereon, it being understood that said lug 151 is shown in Fig. 23 as moving upward, but that when it engages the lever 162 it is moving downward because of the then direction of travel of the pattern chain 148.

Upon the rock shaft 134, as shown most clearly in Fig. 22, is fast a disk 164 having connected thereto an arm 165, to the outer end of which is pivotally connected at 166 a long pawl like member 167 having downwardly extending therefrom a cam like portion 168 and having nearer its outer end a notch 169 terminating in a right angled shoulder 170. The said pawl like member 167 is constantly reciprocated and when permitted to do so, its shoulder 170 engages a pin 171 upon a locking arm or lever 172. The said locking arm or lever is pivoted at 173 upon the framing of the machine and at its upper end 174 a spring 175 is connected and also to an arm or extension 176, on the bracket or framing, so that the tendency of the spring 175 is to hold a locking tooth 177 upon said arm or lever 172 in locking relation with the teeth of a locking wheel 179. The purpose of the cam formation 168 is to cause the shoulder 170 to ride out of engagement with the pin 171 before the limit of outward movement of the pawl arm 167 toward the left viewing Fig. 22. This is accomplished through engagement of said cam formation 168 with the hub 178 of the said locking wheel 179.

The said locking wheel 179 is fast upon the shaft 121 of the rack pinion 47, as shown most clearly in Fig. 24. The shape of the teeth of the locking pinion 179 is such that when the locking tooth 177 is in engagement therewith the pinion 47 is held absolutely without movement.

The sprocket wheel or pinion 152 over which the pattern chain 148 passes, is fast upon a shaft 180 shown most clearly in Fig. 22, and also fast on said shaft is a ratchet 181 by means of which the said shaft is rotated in a step-by-step manner. A holding pawl 182 is employed to prevent return movement of the ratchet. The said ratchet 181 is driven by means of two pawls, shown respectively at 183 and 184 in Fig. 22 and elsewhere, the said pawl 183 being the longer and having a cut away or notched under edge 185 shown most clearly in Fig. 22. Both of said pawls are pivoted at 186 upon the oscillatory disk 164, so that in the oscillations of said disk the teeth of the said pawls rotate the said ratchet 181 in a contraclockwise direction. Springs 187 and 188 are employed to hold the teeth of the said pawls in cooperating movement with the teeth of the ratchet 181.

The lever 162 which is adapted to be moved in a contraclockwise direction viewing Fig. 23 by the laterally extending terminal lug 151 upon the pattern chain, as already described, takes under the longer pawl 183 so as to lift the same out of driving relation with the teeth of the ratchet 181 at the arrival of the end of the chain, it having been already stated that the pattern chain 148 is moved during the formation of the toe so as to use up the chain, although there are no patterning lugs functioning during the formation of the toe.

Suitable means are provided to move both of the pawls 183, 184 out of engagement with the teeth of the ratchet 181 at the end of the pattern upon the pattern chain. For this purpose, means are provided initiated in action from the main pattern drum of the machine, and which main pattern drum is driven in the customary manner. As shown most clearly in Fig. 22, there is provided a rock shaft 189 shown also in Fig. 21. Upon said rock shaft is fast mounted a lever arm 190 which is adapted at its free bent end to engage the under side of the two pawls 183, 184, it first engaging the shorter pawl 184 and then the notched portion 185 of the longer pawl 183 and lifting both pawls out of action for the heel. Again at the commencement of the toe the longer pawl is lifted out of engagement with the ratchet 181 but the shorter pawl is permitted to continue in action throughout the toe so as to use up the chain 148 as already stated.

In order to rock the shaft 189 it also has fast thereon an arm 191 which, as shown in Fig. 22, has pivoted thereto at 192 a link 193, which, as most clearly shown in Fig. 18 extends to the main pattern drum and is operated by suitable cam formations thereon generally indicated at 194.

Means are preferably provided whereby the jacquard drum may be moved to its lowest position at the end of the pattern chain and when said chain has caused all the cams or lugs upon its links to pass under the parts controlled thereby. For this purpose special means are provided acted upon preferably from the main pattern drum of the machine. Herein for the purpose the following means are represented.

Pivoted upon the bracket 130 of the machine 195, as shown most clearly in Fig. 21, is a lever arm 196. Upon the under edge of said lever arm is a lug or projection 197 which rests upon the member 158, so as to press the same down at the proper time and permit the pawl 127 to engage the teeth of its ratchet 123, whereby the shaft 121 is turned in the proper direction and to a sufficient extent to cause the jacquard drum to be moved down to the lowest level therefor ready for the commencement of the next stocking.

Upon the upper edge 199 of said lever 196 rests a pin 200, carried by a lever arm 201, and when said lever arm is rocked in a clockwise direction viewing Fig. 21, the lever 196 is depressed for the purpose stated. The lever 201 is pivoted upon a short shaft 202 on the bracket 130 as shown in Fig. 21. Upon the said shaft 202 is also fast an arm 203, shown in Fig. 18. Said arm 203 is connected to a link 204 which at 205 is itself connected to a lever arm 206 pivoted at 207 co-axially with the lever 193, and extending to the main pattern drum of the machine where it is controlled by a cam formation thereon generally indicated at 208.

In order to prevent undue movement of the jacquard drum in either direction, the two ratchets 122, 123 are provided each with a space or lost tooth formation, one of which is indicated at 209 in Fig. 21.

It has been stated that the pawl like lever 167 is adapted to be lifted at certain times, so that the shoulder 170 thereon does not engage the pin 171 of the locking arm or lever 172. For this purpose there is provided a member which is adapted to contact with the under edge 211 of the pawl lever 167, so as to lift the same. The said member is here represented as a lever 212 shown most clearly in Fig. 23 as pivoted at 213 in Fig. 23 and adapted to be engaged by its arm 214 with whichever end of member 150 or 155 is lifted by a lug upon one edge or the other of the pattern chain 148 as already described. Thus whenever a pawl is permitted to drop into engagement with one of the ratchets 122 or 123, the lever pawl 167 is instantly caused to drop, so that the locking tooth 177 is disengaged from the locking wheel 179, and therefore the rack pinion 47 is free to turn.

Preferably suitable braking means is provided to prevent over movement of the shaft 180 and ratchet 181. For this purpose we preferably provide a leather or other suitable brake strap 215, shown most clearly in Figs. 22 and 23 as suitably connected at its ends and passing over a brake roll, indicated at 216.

As shown most clearly in Figs. 20 and 21, an arm or lever 217 is fast upon the shaft 189 and when it is swung in a contraclockwise direction in the movement of the shaft 189, the pin 218 moves the tripping pawl 125 out of engagement with the teeth of its ratchet 122. At the same time a long arm or lever 219 shown most clearly in Fig. 22 as pivoted upon the shaft 202 swings upwardly and engages a pin 220 upon the pawl lever 167, so as to remove the shoulder 170 of the latter from engagement with the pin 171 on the locking arm or lever 172.

It will be understood that during the formation of the heel and the toe, the locking tooth 177 is in engagement with the teeth of the locking wheel 179.

The rack 45 is guided in the frame 130 (see Figs. 20 and 21).

During the formation of the toe all the parts pertaining to the pattern control mechanism are stationary excepting that the pattern chain 148 is being moved, although all the lugs or cams thereon have acted, so as to bring the chain around to the beginning end thereof for the control of the patterning in the next stocking.

Only the long pawl 183, shown in Fig. 22, operates in the toe and the ring toe and the looping courses, thereby to move the pattern chain 148 until the pattern lugs or cams thereon have functioned. The shorter pawl 184 is for the purpose of moving the pattern chain steadily during the whole operation except during the heel and the toe. As already stated, the wide laterally extending lug 151 at the end of the pattern chain 148, at the proper time rocks the lever 162 so as to throw the long pawl 183 out of operation, the short pawl 184 having already been moved out of action.

In beginning the pattern for the next stocking, the short pawl 184 drops into action, this being permitted by the proper cam or lug on the drum at 194. Then in the continued motion of the pattern chain the wide laterally extending lug 151 moves completely from the lever 162 and the long pawl 183 drops into action, and the two pawls 183, 184 continue in action and act as one, and so continue to act down to the commencement of the heel.

In going into the heel the pawls 125, 127 that control the ratchet 122, 123, are lifted up out of action by the proper cams upon the main pattern drum through the means already described. Also both pawls 183, 184 are lifted out of engagement with the teeth of the ratchet 181 and during the formation of the heel the jacquard drum is oscillated and the dial disk is oscillated, both in synchronism with the oscillating movements of the needle cylinder.

At the end of the formation of the heel, all the said four pawls 125, 127, 183, 184 drop into action.

The locking tooth 177 is always brought into engagement with teeth on the locking wheel 179 just as the movement of either ratchet 122 or 123 ceases and said locking tooth is always thrown out of engagement with the teeth of the locking wheel 179 just before either of said ratchets 122, 123 begins to be picked.

On going into the ring toe the pawl 125 controlling the ratchet 122 is thrown out of action, and the pawl 127 is thrown into engagement with its ratchet 123 so as to move the rack 45 down to its lowest point, this action being under the control of the main pattern drum, as already stated.

It has been stated that if 160 or less needles are employed in the knitting cylinder, we preferably provide one jack in the dial disk for each individual special instrumentality. In Fig. 25, such arrangement is shown sufficiently. Therein we have represented the special instrumentalities at 223, and there is provided for each of them an individual jack 224, and each of said jacks is adapted to be operated upon by an individual projection 225 upon the jacquard drum.

In Fig. 26, we have represented one pattern which may be produced in accordance with our invention. The ring top, or it may be a transferred rib top, is indicated in said figure at 226, and it will be observed that the plating and reverse plating pattern commences at 227 at the termination of the ring top. The pattern in the leg and foot is indicated at 228, and it will be observed that the same contains vertical or lengthwise extending lines 229 of varying lengths and also transverse lines 230 of varying lengths and also diamond shaped figures 231 of various forms. The heel 232 as well as the ring toe 233 and 234 are devoid of plating or reverse plating, as already described.

It will be understood from the foregoing description that throughout the entire formation of the hose or stocking excepting the heel, the toe, the ring toe, and the looping courses, the stitch variation at each stitch in each and every course is under the control of the jacquard drum, whereby an extremely great range of patterning is possible. As already stated, the patterning is preferably one of plating and reverse plating, but the invention in its broad aspect is not limited thereto.

A complete change of pattern can be effected in about two minutes, and this is in practice accomplished in, the following manner: A number of boards are provided, each having a number of lengthwise extending, parallel grooves equalling the number of grooves in the jacquard drum. Jack or selector strips are inserted edgewise in all the grooves of each of the boards (one strip to a groove), and then such formations are removed from these selector strips, or any of them, as may be necessary to result in the production of the desired pattern. These various boards with prepared patterns are kept for use as desired, and when it is desired to change the pattern upon the jacquard drum, in use the upper half circular confining means for the strips on the drum are removed and the selector strips taken out, and as they are taken out they may be and preferably are placed in sequence in the grooves of an empty board, thus preserving the patterns for future use.

Having thus described one embodiment of means of the mechanism of the invention and the best mode known to us for practising the method of the invention and for producing the article or fabric of the invention, we desire it to be understood that although specific terms are employed, they are used in a generic and descriptive sense and not for purposes of limitation, the scope of the invention being set forth in the following claims.

Claims:

1. A knitting mechanism having as an operative part thereof a jacquard drum rotatable without lateral displacement in synchronism with the knitting mechanism, the instrumentalities whereof are, as so rotated, to be controlled by said jacquard drum, and having a plurality of sets of formations, any set of which is adapted to govern the instrumentalities according to the distribution of the formations of such set, and pattern controlled means for imparting axial movement to said jacquard drum so as to bring different sets of formations into functioning relation to said instrumentalities.

2. A knitting machine having a needle carrier and a cam carrier relatively movable with respect to each other and having instrumentalities to be controlled, a jacquard drum movable in synchronism with the movable element of said relatively movable pair of elements and having a plurality of sets of circumferentially arranged formations, any set of which is adapted to govern the instrumentalities according to the distribution of the formations of such set, and pattern controlled means for moving said jacquard drum axially so as to bring different sets of formations into functioning relation to said instrumentalities.

3. A circular knitting machine having independent needles and having relatively rotatable needle cylinder and cam support, a jacquard drum rotatable in synchronism with the rotatable element of the said pair of elements of the machine, said drum having a plurality of sets of circumferentially arranged formations, any set of which is adapted to govern instrumentalities of the machine according to the distribution of the formations of such set, means for imparting axial movement to said jacquard drum, and pattern means for governing such axial move- 4. A circular knitting machine having independent needles and having relatively rotatable needle cylinder and cam support, a jacquard drum rotatable in synchronism with the rotatable element of the said pair of elements of the machine, said drum having a plurality of sets of circumferentially arranged formations, any set of which is adapted to govern instrumentalities of the machine according to the distribution of the formations of such set, means for imparting axial movement to said jacquard drum in opposite directions, and pattern means for controlling said axial movement so as to bring different sets of formations into functioning relation to said instrumentalities.

5. A circular knitting machine having independent needles and having relatively rotatable needle cylinder and cam support, a jacquard drum rotatable in synchronism with the rotatable element of the said pair of elements of the machine, said drum having a plurality of sets of circumferentially arranged formations, any set of which is adapted to govern instrumentalities of the machine according to the distribution of the formations of such set, means for imparting axial movement to said jacquard drum in opposite directions so as to bring different sets of formations into functioning relation to said instrumentalities, and pattern controlled means for causing said axial movement to be incremental in either direction.

6. A circular knitting machine having independent needles and having relatively rotatable needle cylinder and cam support, a jacquard drum rotatable in synchronism with the rotatable element of the said pair of elements of the machine, said drum having a plurality of sets of circumferentially arranged formations, any set of which is adapted to govern instrumentalities of the machine according to the distribution of the formations of such set, means for imparting axial movement to said jacquard drum so as to bring different sets of formations into functioning relation to said instrumentalities, a pattern chain having formations determining the extent of axial movement of said jacquard drum in either direction, and means for driving said pattern chain.

7. A circular hosiery knitting machine having a rotatable needle cylinder with independent needles, an upright, incrementally axially movable, jacquard drum rotatable and reciprocable in synchronism with the movements of the needle cylinder, said drum having a plurality of sets of circumferentially arranged formations, any set of which is adapted to govern instrumentalities of the machine according to the distribution of the formations of such set, and pattern controlled means for governing the extent of the incremental movement of said jacquard drum in an axial direction.

8. A circular hosiery knitting machine having a rotatable needle cylinder with independent needles, an upright, axially movable, jacquard drum rotatable and reciprocable in synchronism with the movements of the needle cylinder said drum having a plurality of sets of circumferentially arranged formations, any set of which is adapted to govern instrumentalities of the machine according to the distribution of the formations of such set, and pattern controlling means for moving said jacquard drum axially whereby said jacquard drum in its movements controls the stitch formation throughout the leg and foot of the stocking, and whereby said jacquard drum is ineffective in controlling the stitch formation during the heel and toe.

9. A circular, independent needle knitting machine having a rotating needle cylinder, means to feed two yarns to the needles in a plating relation, instrumentalities cooperating with at least one of said yarns to effect change from normal plating to reverse plating, or the reverse, a jacquard plating controlling member movable in synchronism with the needle cylinder, and having a plurality of sets of formations, any set of which is adapted to govern the instrumentalities according to the distribution of the formations of such set, and pattern controlled means for imparting to and fro movements to said jacquard member so as to bring different sets of formations into functioning relation to said instrumentalities.

10. A circular, independent needle knitting machine having a rotating needle cylinder, means to feed two yarns to the needles in a plating relation, instrumentalities cooperating with at least one of said yarns to effect change from normal plating to reverse plating, or the reverse, a jacquard plating controlling drum rotatably movable in synchronism with the needle cylinder, said drum having a plurality of sets of circumferentially arranged formations, any set of which is adapted to govern the instrumentalities according to the distribution of the formations of such set, and pattern controlled means for imparting step-by-step movements to said jacquard drum so as to bring different sets of formations into functioning relation to said instrumentalities.

11. A circular, independent needle knitting machine having a rotating needle cylinder, means to feed two yarns to the needles in a plating relation, instrumentalities cooperating with at least one of said yarns to effect charge from normal plating to reverse plating, or the reverse, a jacquard plating controlling drum rotatably movable in synchronism with the needle cylinder and axially movable, said drum having a plurality of sets of circumferentially arranged formations, any set of which is adapted to govern the instrumentalities according to the distribution of the formations of such set, and a pattern member having formations which control the axial movements of the jacquard drum throughout the extent of the article being knitted so as to bring different sets of formations into functioning relation to said instrumentalities.

12. A circular, independent needle knitting machine having a rotating needle cylinder, means to feed two yarns to the needles in a plating relation, instrumentalities co-operating with at least one of said yarns to effect change from normal plating to reverse plating, or the reverse, a jacquard plating controlling drum rotatably movable in synchronism with the needle cylinder and axially movable, said drum having a plurality of sets of circumferentially arranged formations, any set of which is adapted to govern the instrumentalities according to the distribution of the formations of such set, a pattern member having formations which control the axial movements of the jacquard drum throughout the extent of the article being knitted, and means to drive said pattern member automatically so as to bring different sets of formations into functioning relation to said instrumentalities.

13. A circular, independent needle hosiery knitting machine having a rotatable needle cylinder, means to feed two yarns to the needles in a plating relation, instrumentalities cooperating with at least one of said yarns to effect change from normal plating to reverse plating, or the reverse, an incrementally axially movable jacquard plating controlling drum rotatably movable in synchronism with the needle cylinder, said drum having a plurality of sets of circumferentially arranged formations, any set of which is adapted to govern the instrumentalities according to the distribution of the formations of such set, and a pattern chain governing the axial incremental movement of said jacquard drum throughout the formation of the leg and foot whereby the patterning of the entire leg and foot is under the control of said jacquard drum.

14. A circular, independent needle hosiery knitting machine having a rotatable needle cylinder, means to feed two yarns to the needles in a plating relation, instrumentalities cooperating with at least one of said yarns to effect change from normal plating to reverse plating, or the reverse, an incrementally axially movable jacquard plating controlling drum rotatably movable in synchronism with the needle cylinder, said drum having a plurality of sets of circumferentially arranged formations, any set of which is adapted to govern the instrumentalities according to the distribution of the formations of such set, a pattern chain having formations dictating the incremental axial movements of the jacquard drum, means for driving said pattern chain from the knitting machine, and means for rendering said pattern chain temporarily idle.

15. A circular knitting machine having independent needles, a rotary needle cylinder, a jacquard drum rotatable with the needle cylinder, a rack for imparting axial movement to said drum, a pinion meshing with said rack, two oppositely positioned ratchets for driving said pinion in opposite directions, pawls respectively engageable with said ratchets, and means to drive said pawls.

16. A circular knitting machine having independent needles, a rotary needle cylinder, a jacquard drum rotatable with the needle cylinder, a rack for imparting axial movement to said drum, a pinion meshing with said rack, two oppositely positioned ratchets for driving said pinion in opposite directions, pawls respectively engageable with said ratchets, means to drive said pawls, and means to render either pawl temporarily ineffective.

17. A circular knitting machine having independent needles, a rotary needle cylinder, a jacquard drum rotatable with the needle cylinder, a rack for imparting axial movement to said drum, a pinion meshing with said rack, two oppositely positioned ratchets for driving said pinion in opposite directions, pawls respectively engageable with said ratchets, a pattern chain, and means whereby formations of said pattern chain control the engagement of said pawls with said ratchets.

18. A circular, rotatable needle cylinder, knitting machine having independent needles, an axially movable jacquard drum geared to rotate or reciprocate with said needle cylinder, a rack to move said drum axially, a pattern chain having formations and driven at a speed whereby the jacquard drum may control the stitch formation throughout the entire leg and foot of a stocking, and means governed by said pattern chain to control the direction and extent of axial movement of said jacquard drum.

19. A circular, hosiery knitting machine having a rotatable needle cylinder provided with independent needles, a jacquard drum geared to rotate and oscillate with the needle cylinder said drum having a plurality of sets of circumferentially arranged formations, any set of which is adapted to govern instrumentalities of the mechanism by which stitch variation is effected according to the distribution of the formations of such set, means for moving said jacquard drum axially, a pattern member, the length, formation and speed of movement of which are such as to cause the jacquard drum to control the stitch variations throughout the leg and foot of the stocking, and means controlled by the pattern member to determine the direction and extent of the axial movements of the jacquard drum.

20. A circular, hosiery knitting machine having a rotatable needle cylinder provided with independent needles, a jacquard drum geared to rotate and oscillate with the needle cylinder said drum having a plurality of sets of circumferentially arranged formations, any set of which is adapted to govern instrumentalities of the mechanism by which stitch variation is effected according to the distribution of the formations of such set, means for moving said jacquard drum axially, a pattern member, the length, formation and speed of movement of which are such as to cause the jacquard drum to control the stitch variations throughout the leg and foot of the stocking, and means controlled by said pattern member for causing the axial movement of said jacquard drum to be incremental and variable.

21. A circular, rotatable needle cylinder, knitting machine having independent needles, an axially movable jacquard drum geared to rotate or reciprocate with said needle cylinder said drum having a plurality of sets of circumferentially arranged formations, any set of which is adapted to govern instrumentalities of the mechanism by which stitch variation is effected according to the distribution of the formations of such set, a rack to move said drum axially, a pattern member having formations and driven at a speed whereby the jacquard drum may control the stitch formation throughout the entire leg and foot of a stocking, and means governed by said pattern member to control the direction and extent of axial movement of said jacquard drum.

22. A knitting machine of the independent needle character and having relatively movable needle support and cam support, an axially movable jacquard drum geared to move with the movable member of said pair of members, said drum having a plurality of sets of circumferentially arranged formations, any set of which is adapted to govern instrumentalities of the mechanism by which stitch variation is effected according to the distribution of the formations of such set, a rack to move said drum axially, a pattern member having formations and driven at a speed whereby the jacquard drum may control the stitch formation throughout the entire leg and foot of a stocking, and means governed by said pattern member to control the direction and extent of the axial movement of said pattern drum.

23. A circular, rotatable cylinder, knitting machine having independent needles, an axially movable jacquard drum geared to rotate or reciprocate with said needle cylinder, said drum having a plurality of sets of circumferentially arranged formations, any set of which is adapted to govern instrumentalities of the mechanism by which stitch variation is effected according to the distribution of the formations of such set, a rack to move said drum axially, a pattern chain having formations and driven at a speed whereby the jacquard drum may control the stitch formation throughout the production of the knitted fabric by said machine, and means governed by the pattern chain to control the direction and extent of axial movement of said jacquard drum.

24. A circular, rotatable needle cylinder, knitting machine having independent needles, an axially movable jacquard member geared to rotate or reciprocate with said needle cylinder, and having a plurality of sets of formations, any set of which is adapted to govern the instrumentalities according to the distribution of the formations of such set, a rack to move said jacquard member axially, a pattern chain having formations and driven at a speed whereby the jacquard member may control the stitch formation throughout the entire leg and foot of a stocking, and means governed by said pattern chain to control the direction and extent of axial movement of said jacquard member.

25. A circular, rotatable needle cylinder, knitting machine having independent needles, an axially movable jacquard drum geared to rotate or reciprocate with said needle cylinder, said drum having a plurality of sets of circumferentially arranged formations, any set of which is adapted to govern instrumentalities of the mechanism by which stitch variation is effected according to the distribution of the formations of such set, means to move said drum axially, a pattern chain having formations and driven at a speed whereby the jacquard drum may control the stitch formation throughout the entire leg and foot of a stocking, and means governed by said pattern chain to control the direction and extent of axial movement of said jacquard drum.

26. In a seamless hosiery knitting machine, a needle cylinder having independent needles, means to rotate said cylinder, a cam carrier for operating the needles, yarn feeding means, a jacquard drum having pattern formations thereon, means to rotate said drum whereby the pattern formations thereon control the stitch formations or variations at the needles, and means to impart incremental movements to said drum in the direction of the axis thereof, during the production of said hosiery, whereby to present for the said stitch control different circumferential lines of the pattern formations, and pattern controlling means for varying the extent of said incremental movements.

In testimony whereof, we have signed our names to this specification.

JOHN LAWSON.
ROBERT H. LAWSON.